United States Patent
Takahashi et al.

(10) Patent No.: US 9,857,505 B2
(45) Date of Patent: Jan. 2, 2018

(54) LAMINATE BODY AND MANUFACTURING METHOD THEREOF

(75) Inventors: Yuka Takahashi, Chiba (JP); Takuro Tanaka, Chiba (JP); Yukio Hirano, Chiba (JP); Koji Ohguma, Chiba (JP); Mikio Yamahiro, Chiba (JP)

(73) Assignee: JNC CORPORATION, Tokyo (JP)

( * ) Notice: Subject to any disclaimer, the term of this patent is extended or adjusted under 35 U.S.C. 154(b) by 281 days.

(21) Appl. No.: 13/880,048

(22) PCT Filed: Oct. 13, 2011

(86) PCT No.: PCT/JP2011/073515
§ 371 (c)(1),
(2), (4) Date: Jun. 7, 2013

(87) PCT Pub. No.: WO2012/053414
PCT Pub. Date: Apr. 26, 2012

(65) Prior Publication Data
US 2013/0258482 A1     Oct. 3, 2013

(30) Foreign Application Priority Data
Oct. 18, 2010  (JP) ................. 2010-234092

(51) Int. Cl.
*G02B 27/00*  (2006.01)
*G02B 1/111*  (2015.01)
*C08J 7/04*  (2006.01)

(52) U.S. Cl.
CPC .............. *G02B 1/111* (2013.01); *C08J 7/047* (2013.01); *G02B 27/0006* (2013.01); *C08J 2383/14* (2013.01)

(58) Field of Classification Search
CPC .............. G02B 1/11; G02B 27/00; G02B 5/30
See application file for complete search history.

(56) References Cited

U.S. PATENT DOCUMENTS

2001/0046010 A1* 11/2001 Kamijyo ........... G02F 1/133504
349/112
2002/0142133 A1* 10/2002 Matsunaga .......... G02B 5/0221
428/141
(Continued)

FOREIGN PATENT DOCUMENTS

CN      1794016     6/2006
JP    2002-211101   7/2002
(Continued)

OTHER PUBLICATIONS

"International Search Report (Form PCT/ISA/210)", published on Jan. 24, 2012, with English translation thereof, p. 1-p. 6, in which the listed references (JP2009-197071, JP2009-197070, WO2002/077116, JP2002-211101, JP2005-15310) were cited.
(Continued)

*Primary Examiner* — Bumsuk Won
*Assistant Examiner* — Balram Parbadia
(74) *Attorney, Agent, or Firm* — JCIPRNET

(57) ABSTRACT

A laminate body (1) is provided with a transparent substrate (10) and a refractive layer (11) which refracts incident light towards the top of the substrate (10). The refractive layer (11) contains, at least, one kind of fluorine compound (ss) selected from a group consisting of fluoro-silsesquioxane and fluoro-silsesquioxane polymers, and a resin (pl) having a refractive index higher than that of the aforementioned fluorine compound (ss). Of the side of the substrate (10) (the side of the back surface s2) and the side opposite thereof (the side of the front surface s1), the concentration of the fluorine compound (ss) in the refractive layer (11) is higher on said side opposite (the side of the front surface s1), and the refractive layer (11) forms a graded structure layer of high refractive indices and low refractive indices inside the layer.

12 Claims, 5 Drawing Sheets

(56) References Cited

U.S. PATENT DOCUMENTS

| | | | | |
|---|---|---|---|---|
| 2005/0130063 | A1* | 6/2005 | Matsumoto | G02B 5/021 430/270.1 |
| 2006/0132922 | A1* | 6/2006 | Takao et al. | 359/601 |
| 2007/0135602 | A1* | 6/2007 | Yamahiro | C08F 214/18 526/242 |
| 2007/0146887 | A1* | 6/2007 | Ikeda | G02B 1/111 359/586 |
| 2007/0199591 | A1* | 8/2007 | Harder | H01L 31/02168 136/252 |
| 2009/0202819 | A1* | 8/2009 | Asahi | G02B 1/111 428/336 |
| 2010/0265580 | A1* | 10/2010 | Yun | C08F 2/48 359/485.01 |
| 2011/0244185 | A1* | 10/2011 | Dou | B29C 47/0021 428/156 |

FOREIGN PATENT DOCUMENTS

| | | |
|---|---|---|
| JP | 2004-169018 | 6/2004 |
| JP | 2005-015310 | 1/2005 |
| JP | 2009-197070 | 9/2009 |
| JP | 2009-197071 | 9/2009 |
| JP | 2009197071 A * | 9/2009 |
| WO | 02/077116 | 10/2002 |
| WO | 2006035684 | 4/2006 |

OTHER PUBLICATIONS

"Office Action of Taiwan Counterpart Application", dated Jul. 15, 2015, pp. 1-10, with English translation thereof, in which the listed reference was cited.

* cited by examiner

LAMINATE BODY AND MANUFACTURING METHOD THEREOF

CROSS-REFERENCE TO RELATED APPLICATION

This application is a 371 application of an international PCT application serial no. PCT/JP2011/073515, filed on Oct. 13, 2011, which claims the priority benefit of Japan application no. 2010-234092, filed on Oct. 18, 2010. The entirety of each of the above-mentioned patent applications is hereby incorporated by reference herein and made a part of this specification.

TECHNICAL FIELD

The present invention relates to a laminate body having an antireflection function. The invention, particularly, relates to a laminate body having a layer for preventing reflection and glare, and a method for manufacturing thereof.

BACKGROUND ART

The surfaces of image display devices, such as flat panel displays (which is hereinafter referred to as "FPD") including liquid crystal displays, organic electroluminescence displays and plasma panel displays, and of information input devices, such as touch screens, attached to such image display devices have been subjected to an antireflection treatment to impart thereto a function of preventing glare from, for example, fluorescent light. With the increasing tendency toward portable terminals and portable game machines with large screens in recent years, these devices are also required to have an antireflection function. The icon sheets for the displays of cellular phones are also required to have a function of preventing glare and improving the visibility of the screen in addition to the traditional hard coat function. In prior arts, reflection and glare from sunlight or fluorescent light on the screens have been prevented by providing a layer with a controlled refractive index on the surfaces of the films for icon sheets.

One example of such a laminate body having a layer with a controlled refractive index for preventing reflection and glare is an antireflection laminate body including a cured film with a refractive index of 1.60 or higher obtained by curing a curable composition containing (1) 100 parts by weight of titanium oxide particles coated with oxide of one or more metal elements selected from the group consisting of silicon, aluminum, titanium, zirconium, tin, antimony and zinc, (2) 1 to 300 parts by weight of a curable compound and (3) 0.1 to 30 parts by weight of a curing catalyst; a cured film with a lower refractive index; and a substrate layer (for example, refer to Patent Document 1 (sections 0033 to 0035 and FIG. 1)). According to the invention disclosed in Patent Document 1, better antireflective properties can be achieved by an antireflection laminate body obtained by combining a high-refractive index layer composed of a cured film and a layer with a specific low refractive index (section 0019).

PRIOR ART DOCUMENT

Patent Document

Patent Document 1: JP 2004-169018 A.

DISCLOSURE OF INVENTION

Problem to be Solved by the Invention

As described above, a laminate body with good antireflective properties is obtained by combining two layers, a high-refractive index layer and a low-refractive index layer, in the prior art. In other words, to produce the conventional antireflection laminate body, (1) a high-refractive index material, (2) a low-refractive index material and (3) an antifouling material should be laminated on a substrate. In addition, an advanced coating technique is required because the thickness of each film must be controlled strictly, and the plurality of steps leads to an increase in cost. In particular, when an antireflection laminate body provided with a plurality of combinations of a high-refractive index layer and a low-refractive index layer is produced, more time and effort are required.

It is, therefore, an object of the present invention to provide a laminate body having a layer with a controlled refractive index, the laminate body having a smaller number of layers than a conventional laminate body but provided with an antifouling function and high and low refractive indexes, and a method for manufacturing a laminate body by which a layer having an antifouling function and high and low refractive indexes can be formed more easily than by a conventional method.

Means for Solving the Problem

The present inventors conducted intensive studies to solve the above problems. Consequently, the present inventors found that a layer having an antifouling function and both low and high refractive indexes can be formed and, furthermore, such a layer (i.e., a layer having an antifouling function and both low and high refractive indexes) can be formed by one coating process by utilizing the tendency of fluorosilsesquioxane to accumulate in a surface region of a layer readily and quickly, and accomplished the present invention.

A laminate body according to the first aspect of the present invention includes, as shown in FIG. 1, for example, a transparent substrate 10; and a refractive layer 11 for refracting incident light provided on an upper side of the substrate 10, wherein the refractive layer 11 comprises at least one fluorine compound (ss) selected from a group consisting of fluorosilsesquioxane and fluorosilsesquioxane polymers and, a resin (pl) having a higher refractive index than the fluorine compound (ss), wherein a concentration of the fluorine compound (ss) in the refractive layer 11 is higher on a side opposite the substrate 10 (on the obverse surface s1 side) than on a side facing the substrate 10 (on the reverse surface s2 side), and wherein the refractive layer 11 forms a graded-structure layer having a low refractive index and a high refractive index therein.

The term "provided on an upper side of the substrate" includes not only the case of being located on the upper side of the substrate in direct contact therewith but also the case of being located on the upper side of the substrate via another layer. The term "graded-structure layer" refers to a layer in which the refractive index varies because of varying concentration levels of at least one fluorine compound (ss) selected from the group consisting of fluorosilsesquioxane and fluorosilsesquioxane polymers in the refractive layer.

In this configuration, the refractive index of the resin contained in the refractive layer is lower than that of fluorosilsesquioxane or a fluorosilsesquioxane polymer. In addition, in the refractive layer, fluorosilsesquioxane or a fluorosilsesquioxane polymer is mostly on the obverse surface side of the refractive layer. Thus, the refractive layer can have an obverse surface-side region with a low refractive index and a reverse surface-side region with a high refractive index. This is because fluorosilsesquioxane or a fluorosilsesquioxane polymer has a tendency to accumulate at the interface between air and a solid. In addition, fluorosilsesquioxane or a fluorosilsesquioxane polymer has a good antifouling function. Therefore, the laminate body of the present invention can have a low refractive index function, a high refractive index function and an antifouling function by simply having the refractive layer. Moreover, when a hard coat resin is used as the resin contained in the refractive layer, the refractive layer can also serve as a hard coat layer. Further, the options of the low refractive index value can be increased by using fluorosilsesquioxane, a fluorosilsesquioxane polymer or a mixture thereof.

As for the laminate body according to the second aspect of the present invention, in the laminate body according to the first aspect of the invention, the refractive layer 11 is formed by applying a coating liquid containing the fluorine compound (ss) and the resin (pl) to the upper side of the substrate 10 to form a coated film and curing the coated film in a hydrophobic atmosphere, and the fluorine compound has higher hydrophobicity than the resin (pl).

The term "in a hydrophobic atmosphere" refers to being in air or in an inert gas (such as nitrogen, helium or argon), or in a vacuum, for example.

With this configuration, a refractive layer having a low refractive index function, a high refractive index function and an antifouling function can be formed by one coating process. In addition, when a hard coat resin is used as the resin contained in the refractive layer, a refractive layer having strength as well as a low refractive index function, a high refractive index function and an antifouling function can be formed by one coating process.

As for the laminate body according to the third aspect of the present invention, in the laminate body according to the first or the second aspect of the invention, the fluorine compound has a cage structure.

With this configuration, when the hydrophobic atmosphere is air, the rate at which the fluorine compound accumulates at the interface between air and a solid can be increased.

As for the laminate body according to the fourth aspect of the present invention, in the laminate body according to any one of the first aspect to the third aspect of the invention, the fluorosilsesquioxane polymer as the fluorine compound is an addition polymer of fluorosilsesquioxane having one addition-polymerizable functional group or an addition copolymer of fluorosilsesquioxane having one addition-polymerizable functional group with an addition-polymerizable monomer.

With this configuration, an addition polymer suitable as a fluorosilsesquioxane polymer can be used.

As for the laminate body according to the fifth aspect of the present invention, as shown in FIG. 3, the laminate body according to any one of the first aspect to the fourth aspect of the invention, further comprises a hard coat layer 12 between the substrate 10 and the refractive layer 11. In addition, the laminate body according to the fifth aspect of the present invention, as shown in FIG. 4, comprises a print layer 13 having a surface free energy in a range of 30 to 50 mN/m beneath the substrate 10.

With this configuration, because the print layer has appropriate surface free energy, the printability in printing on the print layer by, for example, screen printing, can be improved.

An image display device according to the sixth aspect of the present invention, as shown in FIG. 5, comprises a laminate body 1 (1', 2, 3) according to any one of the first aspect to the fifth aspect of the invention, and an image panel 15 provided beneath the laminate body 1 (1', 2, 3) having the refractive layer 11 on the upper side of the substrate 10.

With this configuration, the image display device has a laminate body which prevents reflection and glare and has good printability. Thus, the visibility of the screen can be improved. In addition, because the adhesion of the print layer is improved in the laminate body, an image display device provided with a laminate body on which a frame of the screen or the like can be easily printed can be obtained.

A method of manufacturing a laminate body according to the seventh aspect of the present invention comprises the steps of: preparing a coating liquid containing at least one fluorine compound (ss) selected from a group consisting of fluorosilsesquioxane and fluorosilsesquioxane polymers, and a resin (pl); applying the coating liquid to an upper side of a transparent substrate 10 in a hydrophobic atmosphere to form a coated film; and curing the coated film in a hydrophobic atmosphere. The resin (pl) has a higher refractive index than the fluorine compound and the fluorine compound has higher hydrophobicity than the resin (pl).

With this configuration, a laminate body having a low refractive index function, a high refractive index function and an antifouling function can be produced by one coating process. In addition, when a hard coat resin is used as the resin contained in the refractive layer, the refractive layer can also serve as a hard coat layer, and a laminate body having a hard coat function as well as a low refractive index function, a high refractive index function and an antifouling function can be produced by one coating process.

Effect of the Invention

The laminate body of the present invention has a smaller number of layers than a conventional laminate body but can be provided with an antifouling function and high and low refractive indexes because a layer comprises at least one fluorine compound selected from the group consisting of fluorosilsesquioxane and fluorosilsesquioxane polymers and a resin having a higher refractive index than the fluorine compound. In addition, a layer having an antifouling function and high and low refractive indexes can be formed more easily than by a conventional method.

BEST MODE FOR CARRYING OUT THE INVENTION

The present application is based on Japanese Patent Application No. 2010-234092 filed on Oct. 18, 2010 in Japan. The content forms part thereof as the content of the present application. The invention will be more completely understood by the detailed description provided hereinafter. Further areas of applicability of the invention will become more apparent from the detailed description provided hereinafter. However, it should be understood that the detailed description and specific examples indicate desired embodiments of the invention, and are provided for the purpose of illustration only because it will be apparent to those skilled in the art that various modifications and variations can be made without departing from the spirit or scope of the invention from the detailed description. Applicants have no intention to present any described embodiments to the public, and among modifications and variations, the subject matter that may not be fallen within the scope of claims should also be part of the invention under the doctrine of equivalents.

Hereinafter, the embodiments of the invention will be explained with reference to drawings. In addition, an identical or similar symbol is attached to a mutually identical part or a corresponding part in each drawing, and an overlapped explanation is omitted. Moreover, the invention is in no way limited to embodiments as described below.

[Laminate Body 1]

Figure 1:
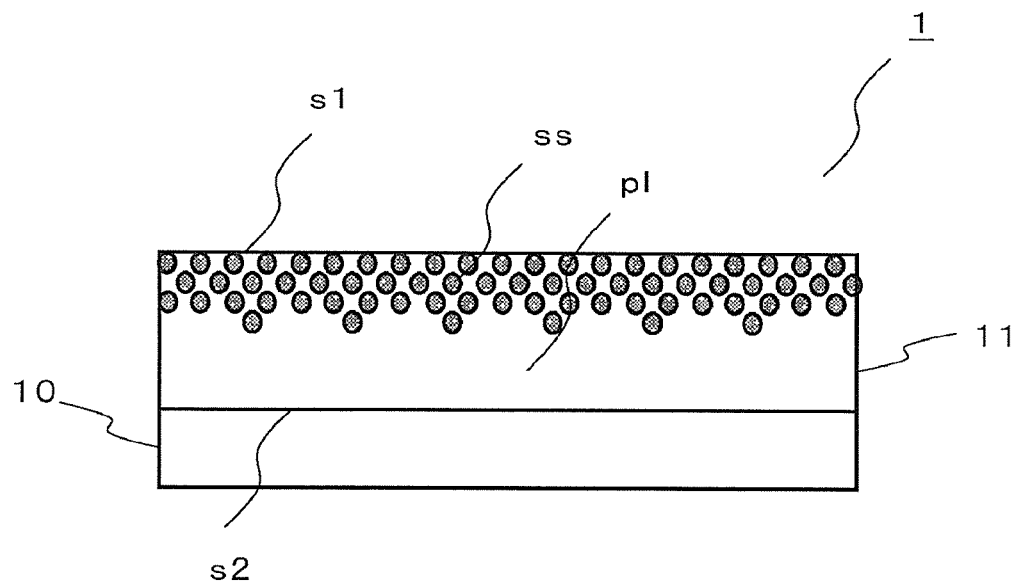
FIG. 1 is a cross-sectional view of a laminate body 1 according to the first embodiment of the present invention.

A laminate film 1 as a laminate body according to the first embodiment of the present invention is described with reference to FIG. 1. It should be noted that FIG. 1 is intended to illustrate the layer configuration of the laminate film 1 having a multi-layer structure and the thickness of each layer is exaggerated in FIG. 1. The laminate film 1 includes a transparent film-like substrate 10, and a refractive layer 11 for refracting incident light. As shown in FIG. 1, the refractive layer 11 is laminated on one of the surfaces of the transparent substrate 10 (on the upper side of the substrate 10 in FIG. 1).

[Substrate 10]

Various transparent film-like plastics or glasses may be used as the substrate 10. Examples of the material of the transparent plastic film include resins such as polyester resin, acetate resin, polyether sulfone resin, polycarbonate resin, polyamide resin, polyimide resin, polyolefin resin, (meth)acrylic resin, polyvinyl chloride resin, polyvinylidene chloride resin, polystyrene resin, polyvinyl alcohol resin, polyarylate resin, polyphenylene sulfide resin and norbornene resin. Specifically, polyethylene terephthalate (PET), polyethylene naphthalate, triacetyl cellulose, polyether sulfone, polycarbonate, polyarylate, polyether ether ketone and so on are preferred. Polyethylene terephthalate and polyethylene naphthalate are more preferred because they have excellent mechanical strength, dimensional stability, heat resistance, chemical resistance, optical characteristics, surface flatness and handleability as a film. Polycarbonate is more preferred because of its excellent transparency, impact resistance, heat resistance, dimensional stability and flammability. When price and availability are also taken into account, polyethylene terephthalate is particularly preferred. Any glass for LCD displays or touch panels with excellent dimensional stability and optical characteristics can be used as the material of the transparent glass film without limitation. Examples include soda-lime glass, alkali-free glass, alkali barium glass, borosilicate glass, alkali borosilicate glass, alumino-borosilicate glass, barium borosilicate glass, alumino-silicate glass, borate glass, silica glass and lead glass.

While there is no specific limitation to the thickness of the substrate 10, the substrate 10 preferably has a thickness of 50 to 300 μm, more preferably 80 to 200 μm when this invention is used as a laminate film. When the thickness of the substrate 10 is 50 μm or greater, the substrate has sufficient mechanical strength that layers can be formed on the substrate. When the thickness is 300 μm or less, the product using the laminate film (such as an image display device as described later) can be compact in size because the laminate film 1 will not be too thick.

[Refractive Layer 11]

As shown in FIG. 1, the refractive layer 11 is formed as a layer at least containing at least one fluorine compound (ss) selected from the group consisting of fluorosilsesquioxane and fluorosilsesquioxane polymers, and a curable resin (pl) as a resin. In other words, the refractive layer 11 is formed by applying a coating liquid containing the fluorine compound (ss) and the curable resin (pl) on a transparent film-like substrate 10 and curing the resulting coated film. It should be noted that the term "fluorine compound" used herein means at least one compound selected from the group consisting of fluorosilsesquioxane and fluorosilsesquioxane polymers as stated above.

The refractive layer 11 needs to contain 0.01 to 20% by weight, preferably 0.1 to 10% by weight, more preferably 1 to 5% by weight, of the fluorine compound (ss) based on the curable resin (pl). The refractive layer 11 has a sufficiently low refractive index when the content of the fluorine compounds (ss) is 0.01% by weight or higher, and the film uniformity of the refractive layer 11 is not impaired when the content of the fluorine compound (ss) is 20% by weight or lower. The type and structure of the fluorosilsesquioxane and fluorosilsesquioxane polymers are described later. To achieve the effects of the present invention, the refractive layer 11 needs to contain 0.001 to 4% by weight, preferably 0.01 to 2% by weight, more preferably 0.1 to 1% by weight, of fluorine (F) based on the curable resin (pl).

A wet coating method, by which the fluorine compound and the curable resin in the form of a solution can be uniformly coated, is preferably used to laminate the refractive layer 11. Examples of usable wet coating methods include gravure coating and die coating. In the present invention, the coating liquid may be free of a solvent and composed only of the fluorine compound and the curable resin, or a mixture with a solvent.

Gravure coating is a process in which a gravure roll having an engraved surface is immersed into a coating liquid and then the coating liquid on the engraved surface of the gravure roll is scraped off with a doctor blade so that a precise amount of coating liquid can remain in the recesses and be transferred onto a substrate. A liquid with a low viscosity can be coated into a thin layer by gravure coating.

Die coating is a process in which coating is made by extruding a liquid from a coating head called die under pressure. Die coating can provide high-accuracy coating. In addition, the coating liquid is less likely to undergo a change in concentration and so on due to drying because the liquid is not exposed to the ambient air during application.

Other examples of wet coating methods include spin coating, bar coating, reverse coating, roll coating, slit coating, dipping, spray coating, kiss coating, reverse kiss coating, airknife coating, curtain coating and rod coating. The laminating method can be selected from these methods as appropriate based on the desired film thickness. In addition, when wet coating is used, a large scale-production can be done with high production efficiency because coating liquid can be applied at a line speed of a few dozen meters per minute (such as approximately 20 m/min).

As used herein, the term "curable resin" means a resin which cures when irradiated with ultraviolet rays or an electron beam or when heated. Examples of the curable resin include silicone resin, acrylic resin, methacrylic resin, epoxy resin, melamine resin, unsaturated polyester resin, urethane resin, polyimide, polyetherimide, polyamideimide, phenol resin, alkyd resin, urea resin, bismaleimide resin, polyester urethane resin and polyether urethane resin. Among these curable resins, an active energy beam-curable resin, which cures into a film in a short time when irradiated with an active energy beam, is preferred from the standpoint of productivity. An active energy beam herein means an energy beam which can decompose a compound that generates an active species to generate an active species. Examples of such an active energy beam include optical energy beams such as visible light, ultraviolet rays, infrared rays, X-rays, α-rays, β-rays, γ-rays and electron beams. More preferably, an ultraviolet curable resin is preferred. An ultraviolet curable resin is usually used after the addition of a photopolymerization initiator. Examples of the photopolymerization initiator include benzoin derivatives, benzophenone derivatives and phenylketone derivatives of various types. The photopolymerization initiator is preferably added in an amount of 1 to 10 parts by weight based on 100 parts by weight of the ultraviolet curable resin.

In addition, a curable resin which has a higher refractive index than the fluorine compound contained together with the curable resin in the refractive layer 11 and can form a high refractive index layer is used as the curable resin for use in the refractive layer 11. The curable resin has a refractive index of 1.50 to 2.20, preferably 1.60 to 1.68. When the refractive index is 1.50 or higher, the difference in refractive index from the fluorine compound is large enough that reflection and glare can be prevented sufficiently. On the other hand, when the refractive index is 2.20 or lower, the difference in refractive index from the substrate 10 is not large, so that the visibility of the laminate film 1 is not decreased because of interference or other reasons when polyethylene terephthalate (PET) is used for the substrate 10, for example. A hard coat resin may be used as the curable resin. The use of a hard coat resin can increase the strength of the film without the need to provide an additional hard coat layer in the laminate film.

Specific examples of the ultraviolet curable resin include resins having an unsaturated bond capable of radical polymerization such as (meth)acrylate monomer, unsaturated polyester resin, polyester (meth)acrylate resin, epoxy (meth)acrylate resin and urethane (meth)acrylate resin.

Examples of the (meth)acrylate monomers include compounds obtained by reacting a polyhydric alcohol with an α,β-unsaturated carboxylic acid. Specific examples include polyalkylene glycol di(meth)acrylate, ethylene glycol (meth)acrylate, propylene glycol (meth)acrylate, polyethylene polytrimethylolpropane di(meth)acrylate, trimethylolpropane tri(meth)acrylate, trimethylolpropane ethoxy tri(meth)acrylate, trimethylolpropane diethoxy tri(meth)acrylate, trimethylolpropane triethoxy tri(meth)acrylate, trimethylolpropane tetraethoxy tri(meth)acrylate, trimethylolpropane pentaethoxy tri(meth)acrylate, tetramethylolmethane tetra(meth)acrylate, tetramethylolpropane tetra(meth)acrylate, pentaerythritol tri(meth)acrylate, pentaerythritol tetra(meth)acrylate, pentaerythritol penta(meth)acrylate, dipentaerythritol penta(meth)acrylate and dipentaerythritol hexa(meth)acrylate. Examples also include compounds having a silsesquioxane skeleton and having a (meth)acrylate group as a functional group.

Examples of the unsaturated polyester resin include resins prepared by dissolving a condensation product (unsaturated polyester) resulting from an esterification reaction between a polyhydric alcohol and an unsaturated polybasic acid (and optionally a saturated polybasic acid) in a polymerizable monomer.

The unsaturated polyester can be produced by polycondensation of an unsaturated acid, such as maleic anhydride, with a diol, such as ethylene glycol. Specific examples include reaction products of an acid component composed of a polybasic acid having a polymerizable unsaturated bond, such as fumaric acid, maleic acid or itaconic acid, or an anhydride thereof with an alcohol component composed of a polyhydric alcohol, such as ethylene glycol, propylene glycol, diethylene glycol, dipropylene glycol, 1,2-butanediol, 1,3-butanediol, 1,5-pentane diol, 1,6-hexane diol, 2-methyl-1,3-propanediol, 2,2-dimethyl-1,3-propanediol, cyclohexane-1,4-dimethanol, ethylene oxide adduct of bisphenol A or propylene oxide adduct of bisphenol A. When necessary, a polybasic acid having no polymerizable unsaturated bond, such as phthalic acid, isophthalic acid, terephthalic acid, tetrahydrophthalic acid, adipic acid or sebacic acid, or an anhydride thereof may be added as an acid component.

Examples of the polyester (meth)acrylate resin include (1) (meth)acrylate obtained by reacting a carboxyl-terminated polyester obtained from a saturated polybasic acid and/or an unsaturated polybasic acid and a polyhydric alcohol with an epoxy compound containing an α,β-unsaturated carboxylic acid ester, (2) (meth)acrylate obtained by reacting a carboxyl-terminated polyester obtained from a saturated polybasic acid and/or an unsaturated polybasic acid and a polyhydric alcohol with a hydroxyl group-containing acrylate, and (3) (meth)acrylate obtained by reacting a hydroxyl-terminated polyester obtained from a saturated polybasic acid and/or an unsaturated polybasic acid and a polyhydric alcohol with (meth)acrylic acid.

Examples of the saturated polybasic acid used as an ingredient of the polyester (meth)acrylate include polybasic acids having no polymerizable unsaturated bond, such as phthalic acid, isophthalic acid, terephthalic acid, tetrahydrophthalic acid, adipic acid and sebacic acid, and anhydrides thereof, and polymerizable unsaturated polybasic acid, such as fumaric acid, maleic acid and itaconic acid, and anhydrides thereof. Examples of the polyhydric alcohol component are the same as those for the unsaturated polyester.

Examples of the epoxy (meth)acrylate resin include resins prepared by dissolving a compound (vinyl ester) having a polymerizable unsaturated bond which is formed by a ring-opening reaction of a glycidyl-containing compound with the carboxyl groups of a carboxyl compound having a polymerizable unsaturated bond, such as acrylic acid, in a polymerizable monomer.

The vinyl ester may be produced by a heretofore known method. Examples include epoxy (meth)acrylate obtained by reacting an epoxy resin with an unsaturated monobasic acid, such as acrylic acid or methacrylic acid.

Epoxy resins of various types may be reacted with a bisphenol (such as bisphenol A) or a dibasic acid, such as adipic acid, sebacic acid or dimer acid (HARIDIMER 270S: Harima Chemicals Group, Inc.) to impart flexibility to the resins.

Examples of the epoxy resin as an ingredient include bisphenol A diglycidyl ether and high-molecular weight homologues thereof, and novolak-type glycidyl ethers.

Examples of the urethane (meth)acrylate resin include a radical polymerizable unsaturated group-containing oligomer obtained by reacting a polyisocyanate with a polyhydroxy compound or polyhydric alcohols and then reacting the reaction product with a hydroxyl group-containing (meth)acryl compound and optionally a hydroxyl group-containing allyl ether compound.

Specific examples of the polyisocyanate include 2,4-tolylenediisocyanate and isomers thereof, diphenylmethane diisocyanate, hexamethylene diisocyanate, hydrogenated xylylene diisocyanate, isophorone diisocyanate, xylylene diisocyanate, dicyclohexylmethane diisocyanate, naphthaline diisocyanate, triphenylmethane triisocyanate, Burnock D-750 and Crisvon NK (trade names; manufactured by DIC Corporation), Desmodule L (trade name; manufactured by Sumitomo Bayer Urethane Co., Ltd.), Coronate L (trade name; manufactured by Nippon Polyurethane Industry Co., Ltd.), Takenate D102 (trade name; manufactured by Mitsui Chemicals, Inc.) and Isonate 143L (trade name; manufactured by Mitsubishi Chemical Corporation).

Examples of the polyhydroxy compound include polyester polyol and polyether polyol, and specific examples thereof include glycerin-ethylene oxide adduct, glycerin-propylene oxide adduct, glycerin-tetrahydrofuran adduct, glycerin-ethylene oxide-propylene oxide adduct, trimethylolpropane-ethylene oxide adduct, trimethylolpropane-propylene oxide adduct, trimethylolpropane-tetrahydrofuran adduct, trimethylolpropane-ethylene oxide-propylene oxide adduct, dipentaerythritol-ethylene oxide adduct, dipentaerythritol-propylene oxide adduct, dipentaerythritol-tetrahydrofuran adduct and dipentaerythritol-ethylene oxide-propylene oxide adduct.

Specific examples of the polyhydric alcohols include ethylene glycol, diethylene glycol, triethylene glycol, polyethylene glycol, propylene glycol, dipropylene glycol, polypropylene glycol, 2-methyl-1,3-propanediol, 1,3-butanediol, adducts of bisphenol A with propylene oxide or ethylene oxide, 1,2,3,4-tetrahydroxybutane, glycerin, trimethylolpropane, 1,2-cyclohexane glycol, 1,3-cyclohexane glycol, 1,4-cyclohexane glycol, paraxylene glycol, bicyclohexyl-4,4-diol, 2,6-decalin glycol and 2,7-decalin glycol.

The hydroxyl group-containing (meth)acryl compound is not particularly limited and is preferably a hydroxyl group-containing (meth)acrylic acid ester. Specific examples include 2-hydroxyethyl (meth)acrylate, 2-hydroxypropyl (meth)acrylate, 3-hydroxybutyl (meth)acrylate, polyethylene glycol mono(meth)acrylate, polypropylene glycol mono (meth)acrylate, di(meth)acrylate of tris(hydroxyethyl)isocyanuric acid and pentaerythritol tri(meth)acrylate.

When necessary, fine particles of a well-known inorganic oxide or composite oxide of a metal, such as titanium, zirconium, zinc, antimony, indium, tin, cerium, tantalum, yttrium, hafnium, aluminum or magnesium may be dispersed in the ultraviolet curable resin or a fluorene compound represented by the following formula (I) may be used in order to adjust the refractive index. A thiourethane resin or an aromatic resin containing a halogen, such as bromine, is also preferred from the standpoint of improvement of the refractive index.

[Chemical Formula 1]

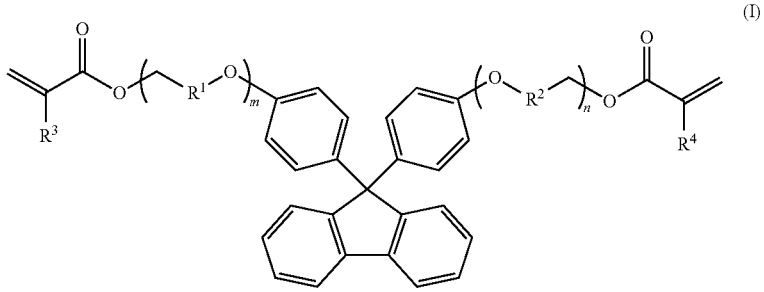

(I)

wherein $R^1$ and $R^2$ individually represent an alkylene group having 2 to 4 carbon atoms, $R^3$ and $R^4$ represent hydrogen and a methyl group, respectively, m and n are integers where m+n=0 to 24 and m and n may be the same or different, and the fluorene skeleton may have a substituent having 1 to 28 carbon atoms.

Specific examples of resins other than the active energy beam-curable resin include polyethylene, polypropylene, polyvinyl chloride, polyvinylidene chloride, polystyrene, acrylonitrile-styrene resin, acrylonitrile-butadiene-styrene resin, poly(meth)acrylate resin, ultrahigh molecular weight polyethylene, poly-4-methylpentene, syndiotactic polystyrene, polyamide (such as Nylon 6: trade name of DuPont Ltd., Nylon 6,6: trade name of DuPont Ltd., Nylon 6,10: trade name of DuPont Ltd., Nylon 6,T: trade name of DuPont Ltd. or Nylon MXD6: trade name of DuPont Ltd.), polyester (such as polyethylene terephthalate, polybutylene terephthalate or polyethylene-2,6-naphthalene dicarboxylate), polyacetal, polycarbonate, polyphenylene oxide, fluorine resin (such as polytetrafluoroethylene or polyvinylidene fluoride), polyphenylene sulfide, polysulfone, polyether sulfone, polyether ether ketone and polyarylate. These resins may be used singly or in combination of two or more.

In the mean time, the fluorosilsesquioxane or the like has a refractive index of 1.20 to 1.50, preferably 1.39 to 1.48. When the refractive index is 1.50 or lower, reflection and glare can be sufficiently prevented because the difference in refractive index from the curable resin does not become too small. It should be noted that the refractive index of the silsesquioxane or the like must be adjusted to be lower than the refractive index of the curable resin.

The curable resin for use in the refractive layer 11 is used in the form of a coating liquid which can be applied to a transparent film-like substrate or the like. Thus, the curable resin is preferably in the form of a liquid. When the curable resin is solid, it is dissolved in a solvent before use.

The concentration of the curable resin in the coating liquid can be so selected that the coating liquid has a viscosity suitable for the coating method such as wet coating. The concentration is preferably 1 to 80% by weight, more preferably 3 to 60% by weight. The concentration of the curable resin in the coating liquid can be adjusted using a solvent. As the solvent, a commonly-used organic solvent, such as methyl ethyl ketone or methyl isobutyl ketone, may be used. When the solubility of the curable resin in the solvent is low due to the length of the fluoroalkyl group of the fluorine compound contained together therewith in the refractive layer 11, a fluorine-based organic solvent may be used. When necessary, heretofore known additives including a leveling agent, such as a surfactant, may be added to the coating liquid. The addition of a leveling agent enables the surface tension of the coating liquid to be controlled to prevent surface defects, such as crawling and craters, which may occur during the layer formation.

Examples of the cure treatment to cure the curable resin include ultraviolet irradiation, heating and electron beam irradiation. When the coated film contains a solvent, the cure treatment is preferably performed after removing the solvent remaining in the coated film by heating the coated film typically at a temperature in the range of 70 to 200° C. for a few dozens of minutes. When curing by ultraviolet irradiation is employed, the coating liquid may be irradiated with ultraviolet rays with a wavelength of 200 to 400 nm from a UV lamp (such as a high-pressure mercury lamp, ultrahigh-pressure mercury lamp, metal halide lamp or high-power metal halide lamp) for a short period of time (in the range of a few seconds to a few dozens of seconds). When curing by heating is employed, the coating liquid is usually heated at a temperature of 180 to 250° C., preferably 200 to 250° C. At this time, the coating liquid may be heated for 30 to 90 minutes in an oven or for 5 to 30 minutes on a hot plate. When curing by electron beam irradiation is employed, the coating liquid is irradiated with a low-energy electron beam from a self-shielded low-energy electron accelerator with energy of 300 keV or lower.

The refractive layer 11 has a thickness of 0.1 to 20 μm, preferably 0.5 to 10 μm. When the thickness is less than 0.1 μm, the durability or chemical resistance may be poor because a cross-linking structure is unlikely to be formed in the curable resin. On the other hand, when the thickness is greater than 20 μm, the thickness is so large that transparency, such as total light transmittance, may be lowered.

The refractive layer 11 contains a fluorine compound and a curable resin having a higher refractive index than the fluorine compound. A fluorine compound has a tendency to accumulate at the interface between air and a solid in a hydrophobic atmosphere (for example, in the air). This is believed to be because a fluorine compound containing a fluorine group has higher hydrophobicity than resins and is therefore drawn toward the air. Thus, because the fluorine compound accumulates on the obverse surface s1 side (refer to FIG. 1) in the refractive layer 11 during the coating process, the concentration of the fluorine compound in the refractive layer 11 becomes higher on the obverse surface s1 side. As a result, the refractive layer 11 forms a graded-structure layer composed of the fluorine compound (a low refractive index) and the curable resin (a high refractive index). In other words, the refractive layer 11 can have a low refractive index and a high refractive index in spite of being a single layer.

In addition, the fluorine compound has excellent properties as an antifouling material and therefore can improve the antifouling properties of the obverse surface s1 of the refractive layer 11.

Figure 2:
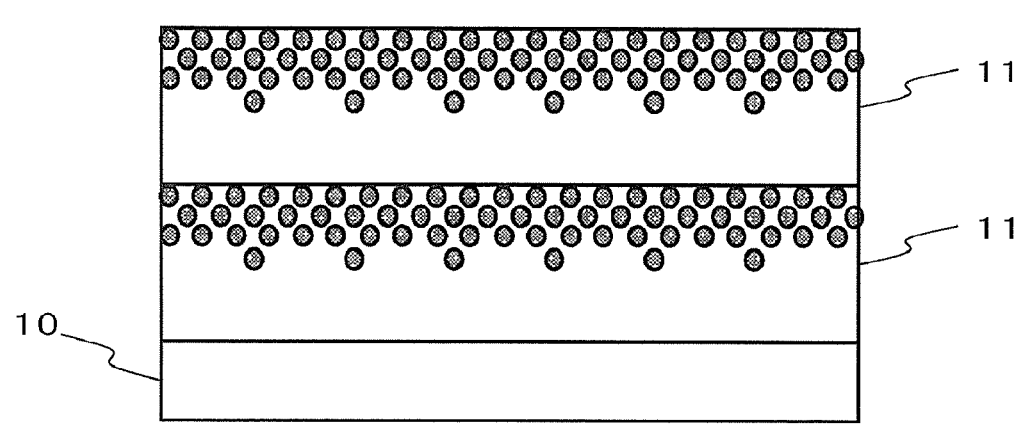
FIG. 2 is a cross-sectional view of laminate body 1', which is the same as the laminate body 1 according to the first embodiment of the present invention except for having a plurality of refractive layers 11.

As described above, in the present invention, the laminate film 1, which has good antireflection properties, can be produced without providing two layers, i.e., a low-refractive index layer and a high refractive index layer, in other words, only by providing the substrate 10 and the refractive layer 11. As shown in FIG. 2, the laminate film 1 may be formed as a laminate film 1' having two or more refractive layers 11. When two or more refractive layers 11 are provided, the wavelength range of the light which can be prevented from reflecting can be increased.

[Laminate Body 2]

Figure 3:
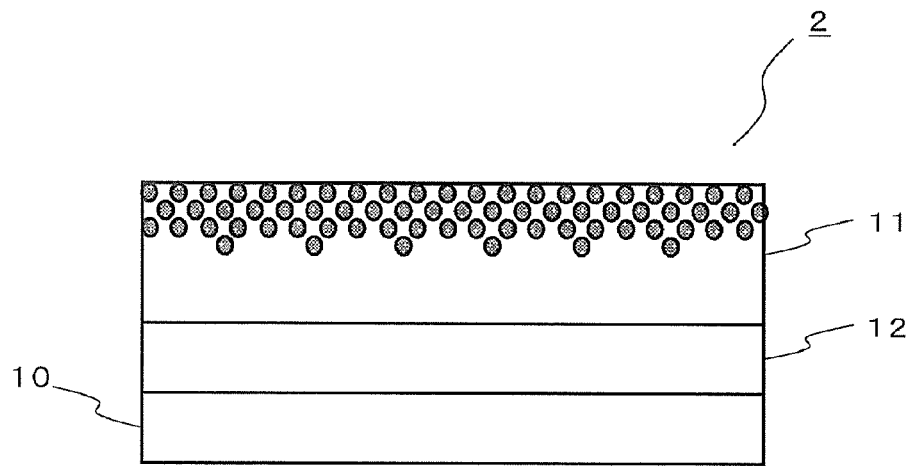
FIG. 3 is a cross-sectional view of a laminate body 2 according to the second embodiment of the present invention.

A laminate film 2 as a laminate body according to the second embodiment of the present invention is described with reference to FIG. 3. The laminate film 2 includes a hard coat layer 12 between the substrate 10 and the refractive layer 11. In other words, the hard coat layer 12 is formed by applying a coating liquid containing a curable hard coat resin to the substrate 10 and curing the resulting coated film. After that, the refractive layer 11 is formed on the hard coat layer 12. The hard coat layer 12 can improve the strength of the laminate film 2 even when it is provided under the refractive layer 11 as shown in FIG. 3 (even when the hard coat layer 12 is not the most superficial layer).

The type of the curable resin for use in the hard coat layer and the methods for applying and curing the curable resin may be the same as those described in connection with the curable resin for the refractive layer 11. The curable resins for use in the refractive layer 11 and the hard coat layer 12 may be of the same type or different types. When the same curable resin is used, the productivity can be improved because the same materials can be used. When different curable resins are used, the options for the type of curable resin can be increased.

The hard coat layer 12 can improve the strength of the laminate film 2. In addition, when an additional hard coat layer is provided, the options for the curable resin for use in the refractive layer 11 can be increased because a resin other than hard coat resins can be selected as the curable resin for use in the refractive layer 11 without lowering the strength of the laminate film 2.

The hard coat layer 12 preferably has a thickness of 0.1 to 20 μm, more preferably 0.5 to 10 μm. When the thickness is 0.1 μm or greater, the durability and chemical resistance are unlikely to decrease because a cross-linking structure tends to be formed in the curable resin. On the other hand, when the thickness is 20 μm or less, the hard coat layer 12 is not too thick, so that its transparency, such as total light transmittance, is not lowered. There is no particular limitation to the refractive index of the hard coat layer 12.

However, the refractive index may be adjusted to reduce interference fringes when necessary.

[Laminate Body 3]

A laminate film 3 as a laminate body according to the third embodiment of the present invention is described with reference to FIG. 4. The laminate film 3 includes a print layer 13 beneath the substrate 10 (on the side opposite the refractive layer 11 in FIG. 4).

[Print Layer 13]

The print layer 13 is formed by applying a coating liquid containing a curable resin to the lower surface of the substrate 10 and curing the resulting coated film. The methods for applying and curing the curable resin for the print layer 13 may be the same as the applying and curing methods described in connection with the refractive layer 11.

The print layer 13 is formed of a curable resin composed of an acrylic compound having at least one of a hydroxyl group, a carboxyl group, a polyethylene glycol chain and a polypropylene glycol chain. Examples include acrylic compounds having a hydroxyl group such as pentaerythritol triacrylate, acrylic compounds having a carboxyl group such as 2-methacryloyloxyethyl succinate, acrylic compounds having a polyethylene glycol chain such as ethoxylated glycerin triacrylate, polyethylene glycol diacrylate and polyethylene glycol dimethacrylate, and acrylic compounds having a polypropylene glycol chain such as polypropylene glycol diacrylate and ethoxylated polypropylene glycol dimethacrylate.

The print layer 13 is formed to have a surface free energy of 30 to 50 mN/m, preferably 35 to 45 mN/m by the effect of the functional group (or polymer chain) contained in the curable resin for the print layer 13. While there is no particular limitation to the ink for use in printing on the print layer 13, the use of an ink suitable for screen printing is preferred to fully achieve the effects of the present invention. When the surface free energy is 30 mN/m or higher, print layer 13 adheres sufficiently firmly. On the other hand, when the surface free energy is 50 mN/m or lower, the difference in surface tension from the ink for the print layer is not too large, so that printing can be easily made.

The surface free energy of the print layer 13 may be adjusted by blending two or more acrylic compounds. In this case, the surface free energy can be adjusted to a desired value more easily. Alternatively, the surface free energy may be adjusted by adding a surfactant or the like to the print layer 13.

The print layer has a refractive index of 1.30 to 1.70, preferably 1.40 to 1.60. When the refractive index is 1.30 or higher, the visibility of the laminate film 1 is not decreased because of interference or other reasons. On the other hand, when the refractive index is 1.70 or lower, the difference in refractive index from the substrate 10 is not too large, so that that the visibility of the laminate film 1 is not decreased because of interference or other reasons when PET is used for the substrate 10, for example.

The print layer 13 has a thickness of 0.5 to 5.0 μm, preferably 2.0 to 4.0 μm. When the thickness is 0.5 μm or greater, the durability and chemical resistance may not be poor because a cross-linking structure tends to be formed in the curable resin. On the other hand, when the thickness is 5.0 μm or less, the print layer 13 is not too thick, so that its transparency, such as total light transmittance, is not lowered.

Figure 4:
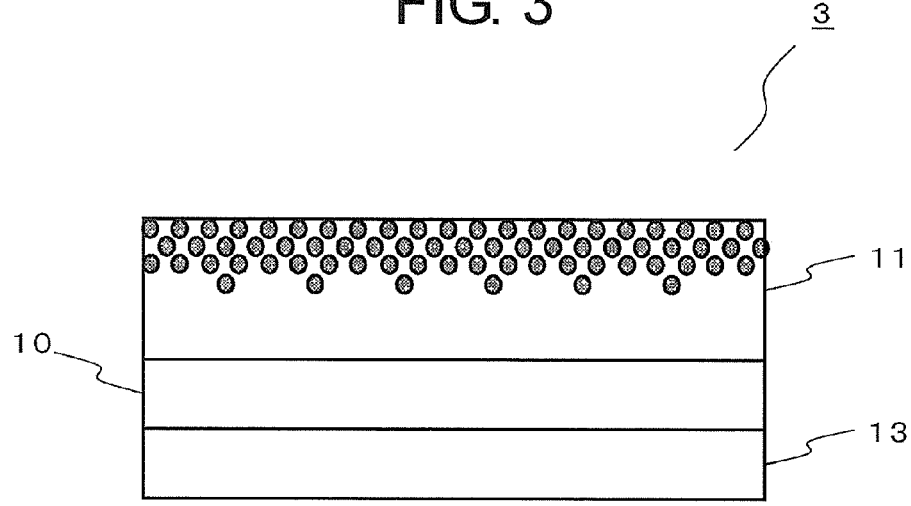
FIG. 4 is a cross-sectional view of a laminate body 3 according to the third embodiment of the present invention.

The laminate film 3 according to the third embodiment of the present invention shown in FIG. 4 may further include the hard coat layer 12 as shown in FIG. 3.

[Image Display Device 4]

Figure 5:
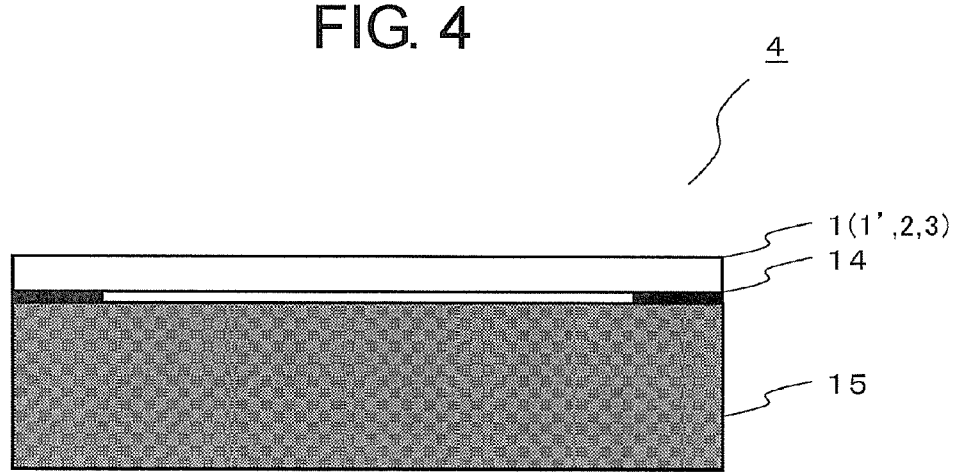
FIG. 5 is a cross-sectional view of an image display device 4 according to the fourth embodiment of the present invention which is provided with a laminate body of the present invention.

An image display device 4 according to the fourth embodiment of the present invention is described with reference to FIG. 5. The image display device 4 includes the laminate film 1 (or 1', 2 or 3) according to the present invention, and an image panel 15 for displaying an image created by a mechanical process. The image panel 15 is a flat panel display, such as CRT, PDP or LCD. As shown in FIG. 5, the laminate film 1 is placed on the image panel 15 with the refractive layer 11 (refer to FIG. 1) facing up. A window frame 14 of the screen of the image panel 15 or the like is printed beneath the laminate film 1.

While there is a gap in the central region of the image display device 4, i.e., between the laminate film 1 and the image panel 15, in FIG. 5 because the window frame 14 is exaggerated, the laminate film 1 is placed in close contact with the image panel 15 in reality.

[Method for Manufacturing a Laminate Body]

Figure 6:
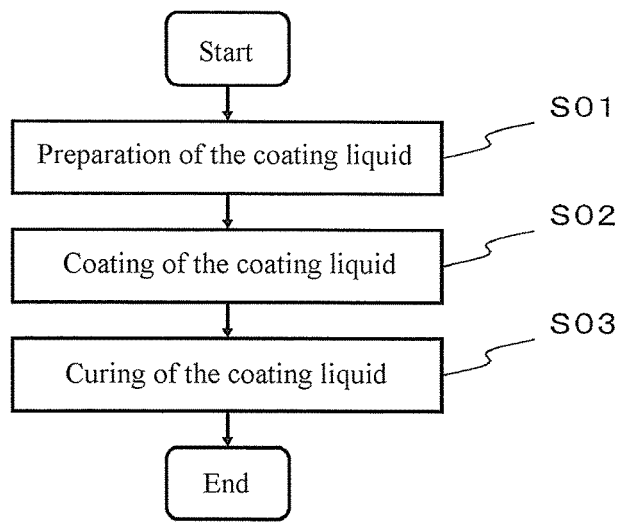
FIG. 6 is a flowchart, illustrating a method for manufacturing a laminate body according to the fifth embodiment of the present invention.

A method for manufacturing a laminate body according to the fifth embodiment of the present invention is described with reference to FIG. 6. First, a coating liquid containing at least one fluorine compound selected from the group consisting of fluorosilsesquioxane and fluorosilsesquioxane polymers and a curable resin is prepared (S01). Specifically, a solution of at least one fluorine compound selected from the group consisting of fluorosilsesquioxane and fluorosilsesquioxane polymers in a solvent and a solution of a curable resin in a solvent are mixed and stirred, for example. Alternatively, the coating liquid may be prepared by directly dissolving at least one fluorine compound selected from the group consisting of fluorosilsesquioxane and fluorosilsesquioxane polymers in a resin in the form of a solution. Next, the coating liquid is applied to an upper side of a transparent substrate in the atmosphere as a hydrophobic atmosphere (S02). Then, the at least one fluorine compound selected from the group consisting of fluorosilsesquioxane and fluorosilsesquioxane polymers and the resin in the coating liquid are cured in the atmosphere as a hydrophobic atmosphere (S03). When an organic solvent is used to prepare the coating liquid, a step of evaporating the organic solvent (which is hereinafter referred to as "drying step") is also included. For example, when an active energy beam (ultraviolet rays or electron beam) is used for the curing and when the coating liquid is free of a solvent, an applying step=>(no drying step)=>a curing step using an active energy beam are included. When the coating liquid contains an organic solvent, an applying step=>a drying step=>a curing step using an active energy beam are included. When the curing is achieved by heating and when the coating liquid is free of a solvent, an applying step=>a thermocuring step are included. When the coating liquid contains an organic solvent, an applying step=>a drying step (=thermocuring step) are included.

The laminate film as a laminate body of the present invention includes a refractive layer having a low refractive index derived from the fluorine compound and a high refractive index derived from the curable resin on one side of the substrate and a print layer with a controlled surface free energy on the other side of the substrate. Thus, the laminate film has an excellent antireflection function and improved printing performance. Such a laminate film is useful as an antireflection film for cellular phones, touch panels, liquid crystal displays and so on. In addition, the laminate body of the present invention is useful not only as ultrathin laminate films as described above but also as an antireflection film for thick acrylic boards, spectacle lenses and so on.

Because the present invention does not require an advanced coating technique as required in a conventional method as described above, a complicated coating process can be simplified and a significant cost-cutting can be therefore achieved.

[Fluorosilsesquioxane]

Silsesquioxane is a generic term for polysiloxane represented by $[(R-SiO_{1.5})_n]$ (wherein R is an arbitrary substituent). The structure of silsesquioxane is generally classified depending on its Si—O—Si skeleton into random structure, ladder structure and cage structure. The cage structure silsesquioxane is further classified into T8 type, T10 type, T12 type and so on depending on the number of Si atoms contained.

Any type of fluorosilsesquioxane may be used in the laminate body of the present invention as long as it has a tendency to accumulate at the interface between air and a solid in a hydrophobic atmosphere (such as air). Any type of fluorosilsesquioxane that accumulate at the interface can fully produce the effects of the present invention.

Among others, one particularly preferred example is fluorosilsesquioxane having a molecular structure represented by formula (II) below.

[Chemical Formula 2]

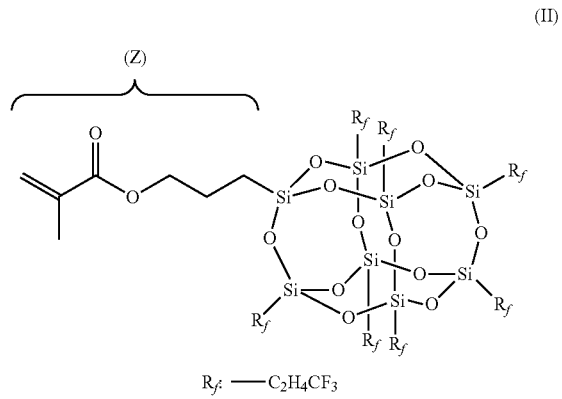

(II)

$R_f$: —$C_2H_4CF_3$

In other words, silsesquioxane having a cage structure, of the three structures of silsesquioxane. i.e., random structure, ladder structure and cage structure, is particularly preferred. When fluorosilsesquioxane having a cage structure is used, the rate of accumulation at the interface can be increased compared to when fluorosilsesquioxane having a different structure is used.

In addition, T8 type, T10 type or T12 type is preferred in view of availability.

Moreover, the substituents ($R_f$) are preferably fluoroalkyl groups. In view of the solubility in a solvent, the substituents $R_f$ preferably have 1 to 8 carbon atoms. In addition, the substituents $R_f$ may be straight-chain groups or branched groups. Specific examples of the straight-chain group include —$CH_2CH_2CF_3$, —$CH_2CH_2CF_2CF_3$, —$CH_2CH_2CF_2CF_2CF_3$, —$CH_2CH_2CF_2CF_2CF_2CF_3$, —$CH_2CH_2CF_2CF_2CF_2CF_2CF_3$ and —$CH_2CH_2CF_2CF_2CF_2CF_2CF_2CF_3$. Specific examples of the branched groups include —$CH_2CH_2CF(CF_3)_2$, —$CH_2CH(CF_3)CF_2CF_3$, —$CH(CF_3)CH_2CF_2CF_3$, —$CH_2C(CF_3)_2CF_3$, —$C(CF_3)_2CH_2CF_3$—$CH_2CH_2CF_2CF(CF_3)_2$, —$CH_2CH_2CF(CF_3)CF_2CF_3$ and —$CH_2CH_2C(CF_3)_2CF_3$. The substituents $R_f$ may be different from each other or may be the same.

In addition, while the formula (II) represents fluorosilsesquioxane which has one Si atom having a "3-(methacryloyloxy)propyl group," the present invention is not limited to this functional group. For example, when the position of the "3-(methacryloyloxy)propyl group" is defined as "Z," the position Z may be substituted by another functional group. Specifically, Z may be hydrogen, a hydroxyl group, alkenyl or halogen (chlorine, bromine or iodine), or a group selected from alkoxy, phenoxy, polyalkyleneoxy, —COOH, 2-oxapropane-1,3-dioyl, alkoxycarbonyl, alkenyloxycarbonyl, oxiranyl, 3,4-epoxycyclohexyl, oxetanyl, oxetanylene, —NH—, —NH$_2$, —CN, —NCO, alkenyl, alkynyl, cycloalkenyl, acryloyloxy, methacryloyloxy, urethane acryloyl, urethane methacryloyl, —SH and —PH$_2$. Alternatively, Z may be one of the above groups (hydrogen to —PH$_2$) bonded via an alkylene group. The alkylene bonded to the Si atom is not particularly limited but is preferably an alkylene group having 1 to 8 carbon atoms, more preferably a propylene group having 3 carbon atoms. However, a group having an alkanoyloxy group, a group having a halogenated sulphonyl group, and a group having an α-haloester group are not included in the options.

When the functional group is polymerizable, the fluorosilsesquioxane may form a single polymer or a copolymer with another common monomer (such as an addition-polymerizable monomer). Fluorosilsesquioxanes having different polymerizable groups may form a copolymer. In this case, any heretofore known polymerization method may be used. As described above, the fluorosilsesquioxane for use in the laminate body of the present invention may be a fluorosilsesquioxane polymer.

[Fluorosilsesquioxane Polymer]

In other words, the fluorosilsesquioxane represented by the formula (II) above may have an addition-polymerizable functional group as "Z." Alternatively, the fluorosilsesquioxane may have an addition-polymerizable functional group as "Z" via an alkylene group. Examples of the addition-polymerizable functional group include a group having a radical-polymerizable functional group of terminal olefin type or internal olefin type; a group having a cationic-polymerizable functional group, such as vinyl ether and propenyl ether; and a group having an anionic polymerizable functional group, such as vinyl carboxyl and cyanoacryloyl. Preferred is a radical-polymerizable functional group.

There is no particular limitation to the radical-polymerizable functional group as long as it is a group capable of undergoing radical polymerization, and examples thereof include methacryloyl, acryloyl, allyl, styryl, α-methylstyryl, vinyl, vinyl ether, vinyl ester, acrylamide, methacrylamide, N-vinylamide, maleic acid ester, fumaric acid ester and N-substituted maleimide. Above all, a group containing a (meth)acryl or styryl group is preferred. The term "(meth)acryl" used herein is a generic name including acryl and methacryl, and thus means acryl and/or methacryl. The same applies below.

Examples of the radical polymerizable functional group having a (meth)acryl group include a group represented by formula (III) below. In formula (III), $Y^1$ represents an alkylene group having 2 to 10 carbon atoms, preferably an alkylene group having 2 to 6 carbon atoms, more preferably a propylene group, and X represents hydrogen or an alkyl group having 1 to 3 carbon atoms, preferably hydrogen or a methyl group.

Examples of the radical polymerizable functional group having a styryl group include a group represented by formula (IV) below. In formula (IV), $Y^2$ represents a single bond or alkylene group having 1 to 10 carbon atoms, preferably a single bond or alkylene group having 1 to 6 carbon atoms, more preferably a single bond or ethylene group. The vinyl group is bonded to any carbon in the benzene ring, preferably to the carbon at the para-position with respect to $Y^2$.

[Chemical Formula 3]

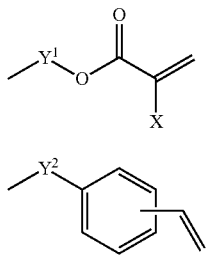

[Addition-Polymerizable Monomer]

There are two types of addition-polymerizable monomers; addition-polymerizable monomer having a cross-linking functional group and addition-polymerizable monomer having no cross-linking functional group. The addition-polymerizable monomer having a cross-linking functional group may be a compound having one or two or more addition-polymerizable double bonds. For example, it may be a vinyl compound, vinylidene compound, or vinylene compound, more specifically, a (meth)acrylic acid compound or styrene compound.

Examples of the (meth)acrylic acid compound include (meth)acrylic acid amide and (meth)acrylonitrile as well as (meth)acrylic acid and (meth)acrylic acid esters.

Examples of the (meth)acrylic acid compound of an addition-polymerizable monomer include (meth)acrylates having a cross-linking functional group. Examples of the cross-linking functional group include epoxy such as glycidyl and epoxycyclohexyl, oxetanyl, isocyanato, acid anhydride, carboxyl and hydroxyl. Preferred are epoxy such as glycidyl and oxetanyl. Specific examples of the (meth) acrylate having a cross-linking functional group include (meth)acrylic acid, hydroxyalkyl (meth)acrylates such as 2-hydroxyethyl (meth)acrylate and 2-hydroxypropyl (meth) acrylate; epoxy-containing (meth)acrylates such as glycidyl (meth)acrylate; alicyclic epoxy-containing (meth)acrylates such as 3,4-epoxycyclohexylmethyl (meth)acrylate; oxetanyl-containing (meth)acrylates such as 3-ethyl-3-(meth) acryloyloxymethyloxetane; 2-(meth)acryloyloxyethyl isocyanate; γ-(methacryloyloxy propyl)trimethoxysilane; (meth)acrylate-2-aminoethyl, 2-(2-bromopropionyloxy) ethyl (meth)acrylate, 2-(2-bromoisobutyryloxy)ethyl (meth) acrylate; 1-(meth)acryloxy-2-phenyl-2-(2,2,6,6-tetramethyl-1-piperidinyloxy)ethane, 1-(4-(4-(meth)acryloxy)ethoxy ethyl)phenylethoxy)piperidine, 1,2,2,6,6-pentamethyl-4-piperidyl (meth)acrylate and 2,2,6,6-pentamethyl-4-piperidyl (meth)acrylate.

Examples of the styrene compound having one addition-polymerizable double bond include styrene compounds having a cross-linking functional group. Specific examples of the cross-linking functional group include epoxy such as glycidyl, oxetanyl, halo, amino, isocyanato, acid anhydride, carboxyl, hydroxyl, thiol and siloxy.

Examples of the styrene compounds having a cross-linking functional group include o-aminostyrene, p-styrenechlorosulfonic acid, styrenesulfonic acid and salts thereof, vinylphenylmethyldithiocarbamate, 2-(2-bromopropionyloxy)styrene, 2-(2-bromoisobutyryloxy)styrene, 1-(2-((4-vinylphenyl)methoxy)-1-phenylethoxy)-2,2,6,6-tetramethylpiperidine and compounds represented by the formulae below.

[Chemical Formula 4]

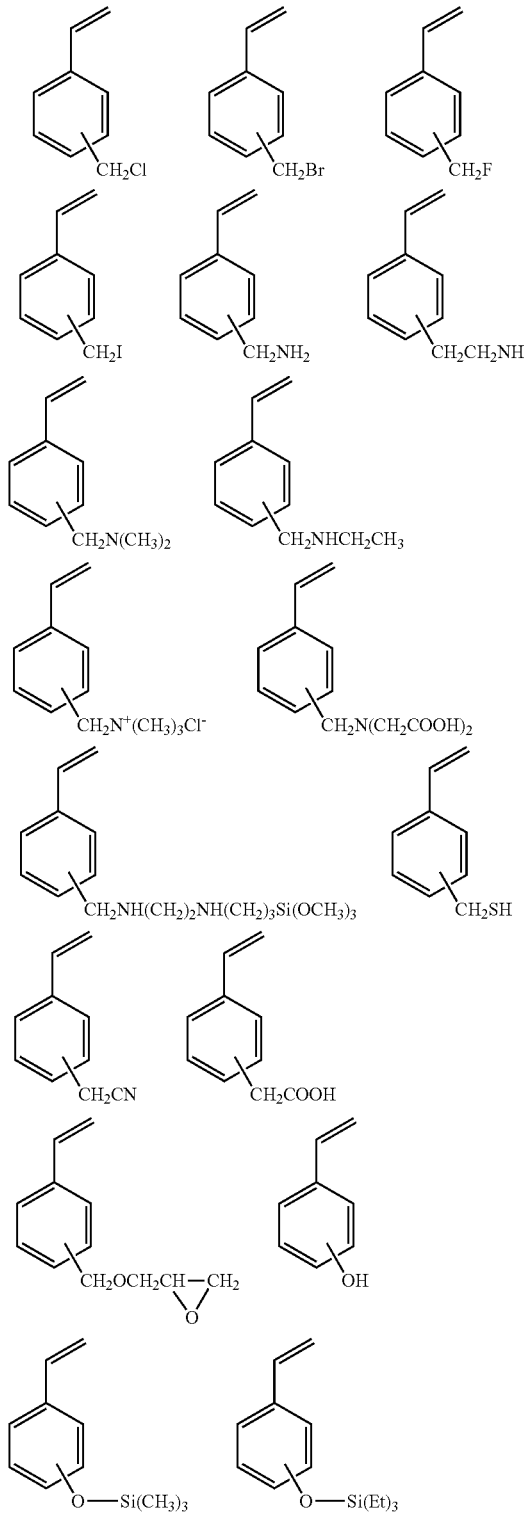

-continued

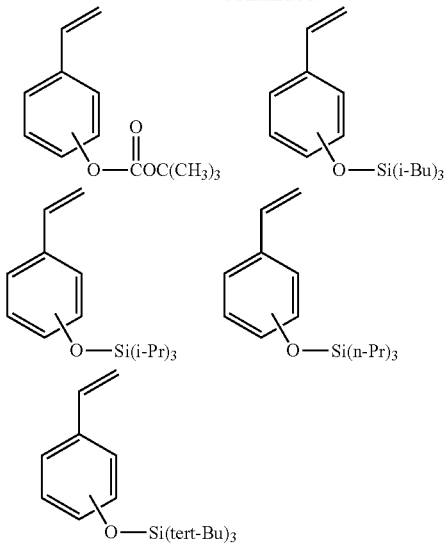

In addition to the addition-polymerizable monomer, an addition-polymerizable monomer other than the above-mentioned addition-polymerizable monomers may be used in combination, when necessary, in order to control compatibility with the curable resin, leveling properties, the amount of crosslinking functional groups in the copolymer, and so on.

Examples of the addition-polymerizable monomer having no crosslinking functional group include a (meth)acrylic acid compound which has one addition-polymerizable double bond and has no cross-linking functional group and a styrene compound which has one addition-polymerizable double bond and has no cross-linking functional group. Specific examples of the (meth)acrylic acid compound include alkyl (meth)acrylates such as methyl (meth)acrylate, ethyl (meth)acrylate, n-propyl (meth)acrylate, isopropyl (meth)acrylate, butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, and stearyl (meth)acrylate; aryl (meth)acrylates such as phenyl (meth)acrylate and toluoyl (meth)acrylate; arylalkyl (meth)acrylates such as benzil (meth)acrylate; alkoxyalkyl (meth)acrylates such as 2-methoxyethyl (meth)acrylate, 3-methoxypropyl (meth)acrylate and 3-methoxybutyl (meth)acrylate; and ethylene oxide adducts of (meth)acrylic acid.

Specific examples of the (meth)acrylic compound which has one addition-polymerizable double bond and has no cross-linking functional group further include fluoroalkyl (meth)acrylates such as trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate and 2-perfluorohexadecylethyl (meth)acrylate.

Examples of the (meth)acrylic compound which has one addition-polymerizable double bond and has no cross-linking functional group further includes a (meth)acrylic compound having a silsesquioxane skeleton. Specific examples of the (meth)acrylic acid compound having a silsesquioxane skeleton include 3-(3,5,7,9,11,13,15-heptaethylpentacyclo[9.5.1.1$^{3,9}$.1$^{5,15}$.1$^{7,13}$]octasiloxane-1-yl)propyl (meth)acrylate, 3-(3,5,7,9,11,13,15-heptaisobutyl-pentacyclo[9.5.1.1$^{3,9}$.1$^{5,15}$.1$^{7,13}$]octasiloxane-1-yl)propyl (meth)acrylate, 3-(3,5,7,9,11,13,15-heptaisooctylpentacyclo[9.5.1.1$^{3,9}$.1$^{5,15}$.1$^{7,13}$]octasiloxane-1-yl)propyl (meth)acrylate, 3-(3,5,7,9,11,13,15-heptacyclopentylpentacyclo[9.5.1.1$^{3,9}$.1$^{5,15}$.1$^{7,13}$]octasiloxane-1-yl)propyl (meth)acrylate, 3-(3,5,7,9,11,13,15-heptaphenylpentacyclo[9.5.1.1$^{3,9}$.1$^{5,15}$.1$^{7,13}$]octasiloxane-1-yl)propyl (meth)acrylate, 3-[(3,5,7,9,11,13,15-heptaethylpentacyclo[9.5.1.1$^{3,9}$.1$^{5,15}$.1$^{7,13}$]octasiloxane-1-yloxy)dimethylsilyl]propyl (meth)acrylate, 3-[(3,5,7,9,11,13,15-heptaisobutylpentacyclo[9.5.1.1$^{3,9}$.1$^{5,15}$.1$^{7,13}$]octasiloxane-1-yloxy)dimethylsilyl]propyl (meth)acrylate, 3-[(3,5,7,9,11,13,15-heptaisooctylpentacyclo[9.5.1.1$^{3,9}$.1$^{5,15}$.1$^{7,13}$]octasiloxane-1-yloxy)dimethylsilyl]propyl (meth)acrylate, 3-[(3,5,7,9,11,13,15-heptacyclopentylpentacyclo[9.5.1.1$^{3,9}$.1$^{5,15}$.1$^{7,13}$]octasiloxane-1-yloxy)dimethylsilyl]propyl (meth)acrylate and 3-[(3,5,7,9,11,13,15-heptaphenylpentacyclo[9.5.1.1$^{3,9}$.1$^{5,15}$.1$^{7,13}$]octasiloxane-1-yloxy)dimethylsilyl]propyl (meth)acrylate. Specific examples of the styrene compound which has one addition-polymerizable double bond and has no cross-linking functional group include styrene, vinyl toluene, α-methylstyrene and p-chlorostyrene.

Examples of the styrene compound which has one addition-polymerizable double bond and has no cross-linking functional group further include a styrene compound containing silsesquioxane. Examples of styrene derivatives containing silsesquioxane include octasiloxanes (T8 type silsesquioxanes) having a 4-vinylphenyl group such as 1-(4-vinylphenyl)-3,5,7,9,11,13,15-heptaethylpentacyclo[9.5.1.1$^{3,9}$.1$^{5,15}$.1$^{7,13}$]octasiloxane, 1-(4-vinylphenyl)-3,5,7,9,11,13,15-heptaisobutylpentacyclo[9.5.1.1$^{3,9}$.1$^{5,15}$.1$^{7,13}$]octasiloxane, 1-(4-vinylphenyl)-3,5,7,9,11,13,15-heptaisooctylpentacyclo[9.5.1.1$^{3,9}$.1$^{5,15}$.1$^{7,13}$]octasiloxane, 1-(4-vinylphenyl)-3,5,7,9,11,13,15-heptacyclopentylpentacyclo[9.5.1.1$^{3,9}$.1$^{5,15}$.1$^{7,13}$]octasiloxane and 1-(4-vinylphenyl)-3,5,7,9,11,13,15-heptaphenylpentacyclo[9.5.1.1$^{3,9}$.1$^{5,15}$.1$^{7,13}$]octasiloxane; and octasiloxanes (T8 type silsesquioxanes) having a 4-vinylphenylethyl group such as 3-(3,5,7,9,11,13,15-heptaethylpentacyclo[9.5.1.1$^{3,9}$.1$^{5,15}$.1$^{7,13}$]octasiloxane-1-yl)ethylstyrene, 3-(3,5,7,9,11,13,15-heptaisobutylpentacyclo[9.5.1.1$^{3,9}$.1$^{5,15}$.1$^{7,13}$]octasiloxane-1-yl)ethylstyrene, 3-(3,5,7,9,11,13,15-heptaisooctylpentacyclo[9.5.1.1$^{3,9}$.1$^{5,15}$.1$^{7,13}$]octasiloxane-1-yl)ethylstyrene, 3-(3,5,7,9,11,13,15-heptacyclopentylpentacyclo[9.5.1.1$^{3,9}$.1$^{5,15}$.1$^{7,13}$]octasiloxane-1-yl)ethylstyrene, 3-(3,5,7,9,11,13,15-heptaphenylpentacyclo[9.5.1.1$^{3,9}$.1$^{5,15}$.1$^{7,13}$]octasiloxane-1-yl)ethylstyrene, 3-((3,5,7,9,11,13,15-heptaethylpentacyclo[9.5.1.1$^{3,9}$.1$^{5,15}$.1$^{7,13}$]octasiloxane-1-yloxy)dimethylsilyl)ethylstyrene, 3-((3,5,7,9,11,13,15-heptaisobutylpentacyclo[9.5.1.1$^{3,9}$.1$^{5,15}$.1$^{7,13}$]octasiloxane-1-yloxy)dimethylsilyl)ethylstyrene, 3-((3,5,7,9,11,13,15-heptaisooctylpentacyclo[9.5.1.1$^{3,9}$.
1$^{5,15}$.1$^{7,13}$]octasiloxane-1-yloxy)dimethylsilyl)ethylstyrene, 3-((3,5,7,9,11,13,15-heptacyclopentylpentacyclo[9.5.1.
1$^{3,9}$.1$^{5,15}$.1$^{7,13}$]octasiloxane-1-yloxy)dimethylsilyl)ethylstyrene and 3-((3,5,7,9,11,13,15-heptaphenylpentacyclo[9.5.1.1$^{3,9}$.
1$^{5,15}$.1$^{7,13}$]octasiloxane-1-yloxy)dimethylsilyl)ethylstyrene.

Examples of the addition-polymerizable monomer other than the above-mentioned addition-polymerizable monomers include macromonomers having a main chain derived from styrene, (meth)acrylic acid ester, siloxane or alkylene oxide such as ethylene oxide or propylene oxide, and one polymerizable double bond.

Examples of the addition-polymerizable monomer also include compounds having two addition-polymerizable double bonds. Examples of the compounds having two addition-polymerizable double bonds include di(meth)acrylate monomers such as 1,3-butanediol=di(meth)acrylate, 1,4-butanediol=di(meth)acrylate, 1,6-hexanediol=di(meth)acrylate, polyethylene glycol=di(meth)acrylate, diethylene glycol=di(meth)acrylate, neopentyl glycol=di(meth)acrylate, triethylene glycol=di(meth)acrylate, tripropylene glycol=di(meth)acrylate, hydroxypivalic acid ester neopentyl glycol=di(meth)acrylate, trimethylolpropane=di(meth)acrylate, bis[(meth)acryloyloxyethoxy]bisphenol A, bis[(meth)acryloyloxyethoxy]tetrabromobisphenol A, bis[(meth)acryloxypolyethoxy]bisphenol A, 1,3-bis(hydroxyethyl)5,5-dimethylhydantoin, 3-methylpentanediol=di(meth)acrylate, di(meth)acrylate of a hydroxypivalic acid ester neopentyl glycol compound and bis[(meth)acryloyloxypropyl]tetramethyldisiloxane, and divinylbenzene.

Examples further include macromonomers having a main chain derived from styrene, (meth)acrylic acid ester, siloxane or alkylene oxide such as ethylene oxide or propylene oxide, and two polymerizable double bonds.

Examples of the addition-polymerizable monomer also include compounds having three or more addition-polymerizable double bonds. Examples of the compounds having three or more addition-polymerizable double bonds include trimethylolpropane=tri(meth)acrylate, pentaerythritol=tri(meth)acrylate, pentaerythritol=tetra(meth)acrylate, dipentaerythritol=monohydroxypenta(meth)acrylate, tris(2-hydroxyethylisocyanate)=tri(meth)acrylate, tris(diethylene glycol)trimerate=tri(meth)acrylate,
3,7,14-tris[(((meth)acryloyloxypropyl)dimethylsiloxy)]-1,3,5,7,9,11,14-heptaethyltricyclo[7.3.3.1$^{5,11}$]heptasiloxane,
3,7,14-tris[(((meth)acryloyloxypropyl)dimethylsiloxy)]-1,3,5,7,9,11,14-heptaisobutyltricyclo[7.3.3.1$^{5,11}$]heptasiloxane,
3,7,14-tris[(((meth)acryloyloxypropyl)dimethylsiloxy)]-1,3,5,7,9,11,14-heptaisooctyltricyclo[7.3.3.1$^{5,11}$]heptasiloxane,
3,7,14-tris[(((meth)acryloyloxypropyl)dimethylsiloxy)]-1,3,5,7,9,11,14-heptacyclopentyltricyclo[7.3.3.1$^{5,11}$]heptasiloxane,
3,7,14-tris[(((meth)acryloyloxypropyl)dimethylsiloxy)]-1,3,5,7,9,11,14-heptaphenyltricyclo[7.3.3.1$^{5,11}$]heptasiloxane, octakis(3-(meth)acryloyloxypropyldimethylsiloxy)octasilsesquioxane and octakis(3-(meth)acryloyloxypropyl)octasilsesquioxane.

Examples further include macromonomers having a main chain derived from styrene, (meth)acrylic acid ester, siloxane, or alkylene oxides such as ethylene oxide or propylene oxide, and three or more polymerizable double bonds.

The addition-polymerizable monomer is preferably a (meth)acrylic acid compound, more preferably a (meth)acrylic acid ester, much more preferably a lower alkyl (having 1 to 3 carbon atoms, for example) ester of (meth)acrylic acid or a (meth)acrylic acid ester having a cross-linking functional group.

The polymer is an addition polymer of fluorosilsesquioxane or an addition copolymer of fluorosilsesquioxane with another addition-polymerizable monomer. When the polymer is a copolymer, it may be an ordered copolymer such as block copolymerization or a random copolymer, and is preferably a random copolymer. The polymer may have a cross-linked structure or may be a graft copolymer.

EXAMPLES

Production Example 1: Synthesis of Polymer A-1

A compound (A) (11.25 g), methyl methacrylate (33.75 g) and 2-butanone (MEK, 104.41 g) were charged in a four-neck flask (300 ml) equipped with a nitrogen-sealed reflux condenser, a thermometer, stirring blades and a septum. Then, after the flask was heated in an oil bath to reflux the mixture for 15 minute, an azobis(isobutyronitrile) (AIBN)/MEK solution (10% by weight, 5.8683 g) was added to initiate polymerization. After allowing the mixture to react for hours, the AIBN/MEK solution (10% by weight, 5.8683 g) was further added and the mixture was aged for 3 hours. The reaction was terminated when gas chromatography showed that the monomer conversion rate reached saturation, whereby an intended MEK solution of polymer A-1 was obtained. The monomer composition, fluorine concentration, weight-average molecular weight: Mw, polydispersity index: Mw/Mn of the resulting polymer A-1 are shown in Table 1. The weight-average molecular weight and polydispersity index were measured with a gel permeation chromatography (GPC, model number: Alliance 2695, manufactured by Waters Corp, column: Shodex GPC KF-804L×2 (connected in series), guard column: KF-G).

The compound (A) has a molecular structure represented by formula (V) below.

[Chemical Formula 5]

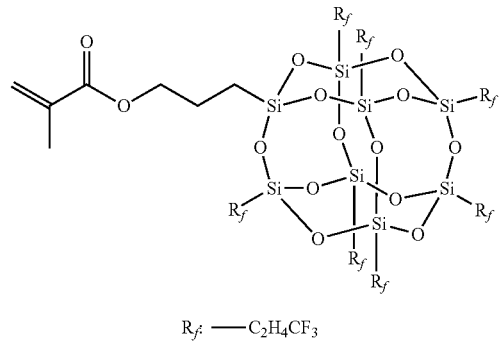

(V)

$R_f$: —$C_2H_4CF_3$

Production Example 1: Preparation and Evaluation of Coating Film

4-Methyl-2-pentanone (MIBK, 9 g) and the MEK solution of polymer A-1 (1 g) were stirred and mixed, thereby obtaining a colorless transparent coating liquid (A-1). The coating liquid (A-1) was applied to a glass substrate (50× 50×0.7 (mm)) by spin coating (rotational speed: 2,000 rpm×15 seconds=>4,000 rpm×60 seconds), and dried by heating, thereby obtaining a transparent coating film (A-1). The film thickness, as measured with a contact level-difference meter (α-STEP IQ, manufactured by KLA-Tencor Corporation), was approximately 80 nm.

Production Example 2: Synthesis of Polymer A-2

The same procedure as in Production Example 1 was repeated except that the amounts of the ingredients were changed as follows: compound (A) (22.5 g), methyl methacrylate (22.5 g), MEK (103.46 g) and AIBN/MEK solution (10% by weight, 15.3551 g). After allowing the mixture to react for 5 hours, the AIBN/MEK solution (10% by weight, 15.3551 g) was further added and the mixture was aged for 3 hours. The reaction was terminated when gas chromatography (GC, model number: GC-14B, manufactured by Shimadzu Corporation) showed that the monomer conversion rate reached saturation, whereby an intended MEK solution of polymer A-2 was obtained. The monomer composition, fluorine concentration, weight-average molecular weight: Mw, polydispersity index: Mw/Mn of the resulting polymer A-2 are shown in Table 1.

Production Example 2: Preparation and Evaluation of Coating Film

MIBK (9 g) and the MEK solution (1 g) of polymer A-2 were stirred and mixed, thereby obtaining a colorless transparent coating liquid (A-2). The same procedure as in Production Example 1 was repeated using the coating liquid (A-2), thereby obtaining a colorless transparent coating film (A-2) (thickness: 80 nm).

Production Example 3: Synthesis of Polymer A-3

The same procedure as in Production Example 1 was repeated except that the amounts of the ingredients were changed as follows: compound (A) (33.75 g), methyl methacrylate (11.25 g), MEK (103.91 g) and AIBN/MEK solution (10% by weight, 10.9739 g). After allowing the mixture to react for 5 hours, the AIBN/MEK solution (10% by weight, 10.9739 g) was further added and the mixture was aged for 3 hours. The reaction was terminated when gas chromatography (GC, model number: GC-14B, manufactured by Shimadzu Corporation) showed that the monomer conversion rate reached saturation, whereby an intended MEK solution of polymer A-3 was obtained. The monomer composition, fluorine concentration, weight-average molecular weight: Mw, polydispersity index: Mw/Mn of the resulting polymer A-3 are shown in Table 1.

Production Example 3: Preparation and Evaluation of Coating Film

MIBK (9 g) and the MEK solution (1 g) of polymer A-2 were stirred and mixed, thereby obtaining a colorless transparent coating liquid (A-3). The same procedure as in Production Example 1 was repeated using the coating liquid (A-3), thereby obtaining a colorless transparent coating film (A-3) (thickness: 80 nm).

Production Example 4: Synthesis of Polymer A-4

The same procedure as in Production Example 1 was repeated except that the amounts of the ingredients were changed as follows: methyl methacrylate (45 g), MEK (104.63 g) and AIBN/MEK solution (10% by weight, 3.6719 g). After allowing the mixture to react for 5 hours, the AIBN/MEK solution (10% by weight, 3.6719 g) was further added and the mixture was aged for 3 hours. The reaction was terminated when gas chromatography (GC, model number: GC-14B, manufactured by Shimadzu Corporation) showed that the monomer conversion rate reached saturation, whereby an intended MEK solution of polymer A-4 was obtained. The monomer composition, fluorine concentration, weight-average molecular weight: Mw, polydispersity index: Mw/Mn of the resulting polymer A-4 are shown in Table 1.

Production Example 4: Preparation and Evaluation of Coating Film

MIBK (9 g) and the MEK solution (1 g) of polymer A-4 were stirred and mixed, thereby obtaining a colorless transparent coating liquid (A-4). The same procedure as in Production Example 1 was repeated using the coating liquid (A-4), thereby obtaining a colorless transparent coating film (A-4) (thickness: 80 nm).

TABLE 1

| Production Example | Polymer | Copolymer composition (% by weight) | | F concentration (%) | Mw (Mw/Mn) |
|---|---|---|---|---|---|
| | | Compound (A) | MMA | | |
| 1 | A-1 | 25 | 75 | 8.2 | 21000(1.7) |
| 2 | A-2 | 50 | 50 | 16.3 | 17200(1.9) |
| 3 | A-3 | 75 | 25 | 24.5 | 16800(1.5) |
| 4 | A-4 | 0 | 100 | 0.0 | 27700(2.3) |

Polymers A-1, A-2 and A-3 have a molecular structure represented by formula (VI) below. In the formula, n and m represent a weight ratio.

[Chemical Formula 6]

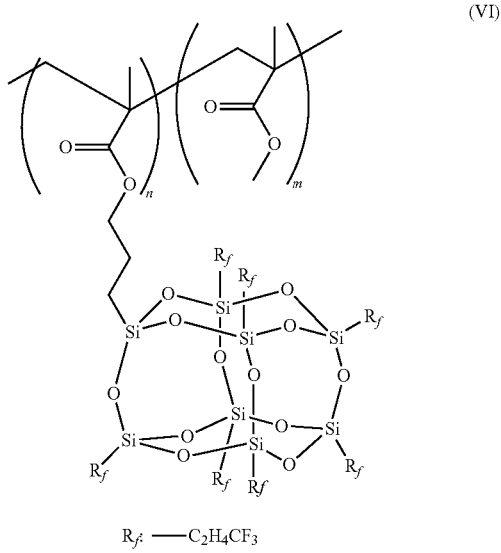

$R_f$: —$C_2H_4CF_3$

Production Example 5: Synthesis of Polymer B-1

The same procedure as in Production Example 1 was repeated except that the ingredients were changed as follows: trifluoroethyl methacrylate (10.83 g) as compound (B), methyl methacrylate (34.17 g), MEK (104.64 g) and AIBN/MEK solution (10% by weight, 3.6443 g). After allowing the mixture to react for 5 hours, the AIBN/MEK solution (10% by weight, 3.6443 g) was further added and the mixture was aged for 3 hours. The reaction was terminated when gas chromatography (GC, model number: GC-14B, manufactured by Shimadzu Corporation) showed that the monomer conversion rate reached saturation, whereby an intended MEK solution of polymer B-1 was obtained. The weight-average molecular weight: Mw, polydispersity index: Mw/Mn of the resulting polymer B-1 are shown in Table 2.

Production Example 5: Preparation and Evaluation of Coating Film

MIBK (9 g) and the MEK solution (1 g) of polymer B-1 were stirred and mixed, thereby obtaining a colorless transparent coating liquid (B-1). The same procedure as in Production Example 1 was repeated using the coating liquid (B-1), thereby obtaining a colorless transparent coating film (B-1) (thickness: 80 nm).

Production Example 6: Synthesis of Polymer B-2

The same procedure as in Production Example 1 was repeated except that the ingredients were changed as follows: trifluoroethyl methacrylate (21.65 g) as compound (B), methyl methacrylate (23.35 g), MEK (104.62 g) and AIBN/MEK solution (10% by weight, 3.8390 g). After allowing the mixture to react for 5 hours, the AIBN/MEK solution (10% by weight, 3.8390 g) was further added and the mixture was aged for 3 hours. The reaction was terminated when gas chromatography (GC, model number: GC-14B, manufactured by Shimadzu Corporation) showed that the monomer conversion rate reached saturation, whereby an intended MEK solution of polymer B-2 was obtained. The weight-average molecular weight: Mw, polydispersity index: Mw/Mn of the resulting polymer B-2 are shown in Table 2.

Production Example 6: Preparation and Evaluation of Coating Film

MIBK (9 g) and the MEK solution (1 g) of polymer B-2 were stirred and mixed, thereby obtaining a colorless transparent coating liquid (B-2). The same procedure as in Production Example 1 was repeated using the coating liquid (B-2), thereby obtaining a colorless transparent coating film (B-2) (thickness: 80 nm).

Production Example 7: Synthesis of Polymer B-3

The same procedure as in Production Example 1 was repeated except that the ingredients were changed as follows: trifluoroethyl methacrylate (32.48 g) as compound (B), methyl methacrylate (12.52 g), MEK (104.61 g) and AIBN/MEK solution (10% by weight, 3.8906 g). After allowing the mixture to react for 5 hours, the AIBN/MEK solution (10% by weight, 3.8906 g) was further added and the mixture was aged for 3 hours. The reaction was terminated when gas chromatography (GC, model number: GC-14B, manufactured by Shimadzu Corporation) showed that the monomer conversion rate reached saturation, whereby an intended MEK solution of polymer B-3 was obtained. The weight-average molecular weight: Mw, polydispersity index: Mw/Mn of the resulting polymer B-3 are shown in Table 2.

Production Example 7: Preparation and Evaluation of Coating Film

MIBK (9 g) and the MEK solution (1 g) of polymer B-3 were stirred and mixed, thereby obtaining a colorless transparent coating liquid (B-3). The same procedure as in Production Example 1 was repeated using the coating liquid (B-3), thereby obtaining a colorless transparent coating film (B-3) (thickness: 80 nm).

TABLE 2

| Production Example | Polymer | Copolymer composition (% by weight) | | F concentration (%) | Mw (Mw/Mn) |
|---|---|---|---|---|---|
| | | Compound (B) | MMA | | |
| 5 | B-1 | 24 | 76 | 8.2 | 29700 (2.5) |
| 6 | B-2 | 48 | 52 | 16.3 | 26700 (2.5) |
| 7 | B-3 | 72 | 28 | 24.5 | 26000 (2.3) |

Polymers B-1, B-2 and B-3 have a molecular structure represented by formula (VII) below.

In the formula, n and m represent a weight ratio.

[Chemical Formula 6]

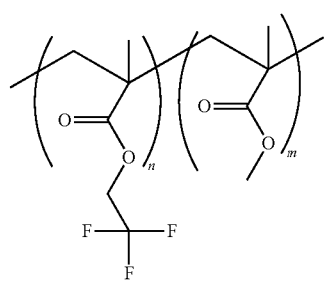

(VII)

Production Example 8: Preparation of Coating Agent

A fluorine-based acrylate (trade name: Ogsol EA-0200, manufactured by Osaka Gas Chemicals Co., Ltd., 61 g), toluene (15.26 g), MEK (63 g) and 2-propanol (IPA, 9 g) were stirred and mixed in a light-resistant plastic bottle. After confirming the mixture had turned to a transparent solution, a photopolymerization initiator (trade name: Irgacure 184, manufactured by BASF Ltd., 1.75 g) was added and the mixture was stirred and mixed, thereby obtaining a coating agent (C).

Production Example 8: Preparation and Evaluation of Coating Film

The same procedure as in Production Example 1 was repeated using the coating agent (C), thereby obtaining a transparent coating film (C-1) (thickness: approximately 3 μm).

[Evaluation]
[Refractive Index]

The refractive indexes of the coating films (A-1 to 4, B-1 to 3 and C-1) of Production Examples 1 to 8 were measured with a spectroscopic ellipsometer (manufactured by J. A. Woollam Co., Inc.). The results of measurements of refractive index at 589 nm are shown in Table 3. The results in Table 3 indicate that the coating film (C-1) has a higher refractive index than the coating films (A-1 to 4 and B-1 to 3).

[Surface Free Energy]

The contact angle between water and diiodomethane was measured on the coating films (A-1 to 4, B-1 to 3 and C-1) of Production Examples 1 to 8 and the surface free energy was calculated. The results are shown in Table 3. The results in Table 3 indicate that the coating film (C-1) has a higher surface free energy than the coating films (A-1 to 3 and B-1 to 3). In other words, the coating film (C-1) has lower hydrophobicity than the coating films (A-1 to 3 and B-1 to 3).

TABLE 3

| Production Example | Coating Film | Refractive index | Surface free energy (mN/m) |
|---|---|---|---|
| 1 | A-1 | 1.473 | 27.8 |
| 2 | A-2 | 1.454 | 26.6 |
| 3 | A-3 | 1.414 | 26.6 |
| 4 | A-4 | 1.491 | 44.6 |
| 5 | B-1 | 1.473 | 36.6 |
| 6 | B-2 | 1.454 | 30.8 |
| 7 | B-3 | 1.423 | 27.6 |
| 8 | C-1 | 1.636 | 42.3 |

Example 1: Preparation of Coating Agent

A coating agent (C) was obtained in the same manner as described in [Production Example 8: Preparation of coating agent].

Example 1: Preparation and Evaluation of Coating Film

The coating agent (C) was applied to a polyethylene terephthalate film (trade name: COSMOSHINE A2401, manufactured by TOYOBO CO., LTD., 100 μm) with a coating rod No. 10 (manufactured by R.D.S. Webster) to form a wet film thereon, and the film was dried at 80° C. for 3 minutes. After that, the film was photocured using a conveyor-type ultraviolet irradiator equipped with a high-pressure mercury lamp (cumulative exposure: 400 mJ/cm$^2$), thereby obtaining a transparent coating film (D) (thickness: approximately 4 μm).

The results of measurement of reflectivity, total light transmittance (T.T.) and haze of the resulting coating film (D) are shown in Table 4.

The reflectivity was measured with an ultraviolet/visible spectrophotometer (model number: UV-2450, manufactured by Shimadzu Corporation), and the haze and total light transmittance were measured with a haze meter (model number: HDN5000, manufactured by NIPPON DENSHOKU INDUSTRIES CO., LTD.).

Example 2: Preparation of Coating Agent

The coating agent (C) (19.98 g) and the MEK solution of polymer A-2 (0.02 g) were charged in a plastic bottle such that the concentration of the polymer A-2 in the solid component of the coating agent was 0.1% by weight, and the mixture was stirred and mixed, thereby obtaining a coating agent (E).

Example 2: Preparation and Evaluation of Coating Film

The same procedure as in Example 1 was repeated using the coating agent (E), thereby obtaining a transparent coating film (thickness: approximately 4 μm). The results of measurement of reflectivity, total light transmittance (T.T.) and haze of the resulting coating film (E) are shown in Table 4.

Example 3: Preparation of Coating Agent

The same procedure as in Example 2 was repeated except that the coating agent was prepared such that the concentration of the polymer A-2 in the solid component of the coating agent was 0.5% by weight, thereby obtaining a coating agent (F).

Example 3: Preparation and Evaluation of Coating Film

The same procedure as in Example 1 was repeated using the coating agent (F), thereby obtaining a transparent coating film (thickness: approximately 4 urn). The results of measurement of reflectivity, total light transmittance (T.T.) and haze of the resulting coating film (F) are shown in Table 4.

Example 4: Preparation of Coating Agent

The same procedure as in Example 2 was repeated except that the coating agent was prepared such that the concentration of the polymer A-2 in the solid component of the coating agent was 2% by weight, thereby obtaining a coating agent (G).

Example 4: Preparation and Evaluation of Coating Film

The same procedure as in Example 1 was repeated using the coating agent (G), thereby obtaining a transparent coating film (thickness: approximately 4 μm). The results of measurement of reflectivity, total light transmittance (T.T.) and haze of the resulting coating film (G) are shown in Table 4.

Example 5: Preparation of Coating Agent

The same procedure as in Example 2 was repeated except that the coating agent was prepared such that the concentration of the polymer A-2 in the solid component of the coating agent was 3% by weight, thereby obtaining a coating agent (H).

Example 5: Preparation and Evaluation of Coating Film

The same procedure as in Example 1 was repeated using the coating agent (H), thereby obtaining a transparent coating film (thickness: approximately 4 μm). The results of measurement of reflectivity, total light transmittance (T.T.) and haze of the resulting coating film (H) are shown in Table 4.

Example 6: Preparation of Coating Agent

The same procedure as in Example 2 was repeated except that the coating agent was prepared such that the concentration of the polymer A-2 in the solid component of the coating agent was 5% by weight, thereby obtaining a coating agent (I).

Example 6: Preparation and Evaluation of Coating Film

The same procedure as in Example 1 was repeated using the coating agent (I), thereby obtaining a transparent coating film (thickness: approximately 4 μm). The results of measurement of reflectivity, total light transmittance (T.T.) and haze of the resulting coating film (I) are shown in Table 4.

TABLE 4

| Example | Coating Film | Composition (% by weight) Polymer A-2 | Ogsol | Reflectivity (550 nm, %) | T.T. (%) | Haze (%) |
|---|---|---|---|---|---|---|
| 1 | D | 0 | 100 | 3.77 | 90.36 | 0.68 |
| 2 | E | 0.1 | 99.9 | 3.38 | 90.38 | 1.02 |
| 3 | F | 0.5 | 99.5 | 3.16 | 90.52 | 0.74 |
| 4 | G | 2 | 98 | 2.99 | 90.22 | 0.72 |
| 5 | H | 3 | 97 | 3.07 | 89.71 | 1.12 |
| 6 | I | 5 | 95 | 3.13 | 89.38 | 2.27 |

Example 7: Preparation of Coating Agent

The same procedure as in Example 2 was repeated except that the coating agent was prepared such that the concentration of the polymer A-3 in the solid component of the coating agent was 2% by weight, thereby obtaining a coating agent (J).

Example 7: Preparation and Evaluation of Coating Film

The same procedure as in Example 1 was repeated using the coating agent (J), thereby obtaining a transparent coating film (J) (thickness: approximately 4 μm). The results of measurement of reflectivity, total light transmittance (T.T.) and haze of the resulting coating film (J) are shown in Table 5.

Example 8: Preparation of Coating Agent

The same procedure as in Example 2 was repeated except that the coating agent was prepared such that the concentration of the polymer A-4 in the solid component of the coating agent was 2% by weight, thereby obtaining a coating agent (K).

Example 8: Preparation and Evaluation of Coating Film

The same procedure as in Example 1 was repeated using the coating agent (K), thereby obtaining a transparent coating film (K) (thickness: approximately 4 μm). The results of measurement of reflectivity, total light transmittance (T.T.) and haze of the resulting coating film (K) are shown in Table 5.

TABLE 5

| Example | Coating Film | Polymer | Composition (% by weight) Polymer | Ogsol | Reflectivity (550 nm, %) | T.T. (%) | Haze (%) |
|---|---|---|---|---|---|---|---|
| 7 | J | A-3 | 2 | 98 | 2.45 | 90.20 | 1.59 |
| 8 | K | A-4 | 2 | 98 | 3.28 | 90.41 | 0.52 |

Comparative Example 1: Preparation of Coating Agent

The same procedure as in Example 2 was repeated except that the coating agent was prepared such that the concentration of the polymer B-2 in the solid component of the coating agent was 0.1% by weight, thereby obtaining a coating agent (L).

Comparative Example 1: Preparation and Evaluation of Coating Film

The same procedure as in Example 1 was repeated using the coating agent (L), thereby obtaining a transparent coating film (L) (thickness: approximately 4 μm). The results of measurement of reflectivity, total light transmittance (T.T.) and haze of the resulting coating film (L) are shown in Table 6.

Comparative Example 2: Preparation of Coating Agent

The same procedure as in Example 2 was repeated except that the coating agent was prepared such that the concentration of the polymer B-2 in the solid component of the coating agent was 0.5% by weight, thereby obtaining a coating agent (M).

Comparative Example 2: Preparation and Evaluation of Coating Film

The same procedure as in Example 1 was repeated using the coating agent (M), thereby obtaining a transparent coating film (M) (thickness: approximately 4 μm). The results of measurement of reflectivity, total light transmittance (T.T.) and haze of the resulting coating film (M) are shown in Table 6.

Comparative Example 3: Preparation of Coating Agent

The same procedure as in Example 2 was repeated except that the coating agent was prepared such that the concentration of the polymer B-2 in the solid component of the coating agent was 2% by weight, thereby obtaining a coating agent (N).

Comparative Example 3: Preparation and Evaluation of Coating Film

The same procedure as in Example 1 was repeated using the coating agent (N), thereby obtaining a transparent coating film (N) (thickness: approximately 4 μm). The results of measurement of reflectivity, total light transmittance (T.T.) and haze of the resulting coating film (N) are shown in Table 6.

Comparative Example 4: Preparation of Coating Agent

The same procedure as in Example 2 was repeated except that the coating agent was prepared such that the concentration of the polymer B-2 in the solid component of the coating agent was 3% by weight, thereby obtaining a coating agent (O).

Comparative Example 4: Preparation and Evaluation of Coating Film

The same procedure as in Example 1 was repeated using the coating agent (O), thereby obtaining a transparent coating film (O) (thickness: approximately 4 μm). The results of measurement of reflectivity, total light transmittance (T.T.) and haze of the resulting coating film (O) are shown in Table 6.

Comparative Example 5: Preparation of Coating Agent

The same procedure as in Example 2 was repeated except that the coating agent was prepared such that the concentration of the polymer B-2 in the solid component of the coating agent was 5% by weight, thereby obtaining a coating agent (P).

Comparative Example 5: Preparation and Evaluation of Coating Film

The same procedure as in Example 1 was repeated using the coating agent (P), thereby obtaining a transparent coating film (P) (thickness: approximately 4 μm). The results of measurement of reflectivity, total light transmittance (T.T.) and haze of the resulting coating film (F) are shown in Table 6.

TABLE 6

| Comparative Example | Coating Film | Composition (% by weight) | | Reflectivity (550 nm, %) | T.T. (%) | Haze (%) |
|---|---|---|---|---|---|---|
| | | Polymer B-2 | Ogsol | | | |
| 1 | L | 0.1 | 99.9 | 3.42 | 90.62 | 0.78 |
| 2 | M | 0.5 | 99.5 | 3.38 | 90.38 | 0.65 |
| 3 | N | 2 | 98 | 3.17 | 90.01 | 0.66 |
| 4 | O | 3 | 97 | 3.19 | 89.80 | 1.02 |
| 5 | P | 5 | 95 | 3.37 | 89.40 | 2.27 |

Comparative Example 6: Preparation of Coating Agent

The same procedure as in Example 2 was repeated except that the coating agent was prepared such that the concentration of the polymer B-3 in the solid component of the coating agent was 2% by weight, thereby obtaining a coating agent (Q).

Comparative Example 6: Preparation and Evaluation of Coating Film

The same procedure as in Example 1 was repeated using the coating agent (Q), thereby obtaining a transparent coating film (Q) (thickness: approximately 4 μm). The results of measurement of reflectivity, total light transmittance (T.T.) and haze of the resulting coating film (Q) are shown in Table 7.

TABLE 7

| Comparative Example | Coating Film | Composition (% by weight) | | | Reflectivity (550 nm, %) | T.T. (%) | Haze (%) |
|---|---|---|---|---|---|---|---|
| | | Polymer | Polymer | Ogsol | | | |
| 6 | Q | B-3 | 2 | 98 | 3.04 | 90.02 | 2.77 |

Figure 7:
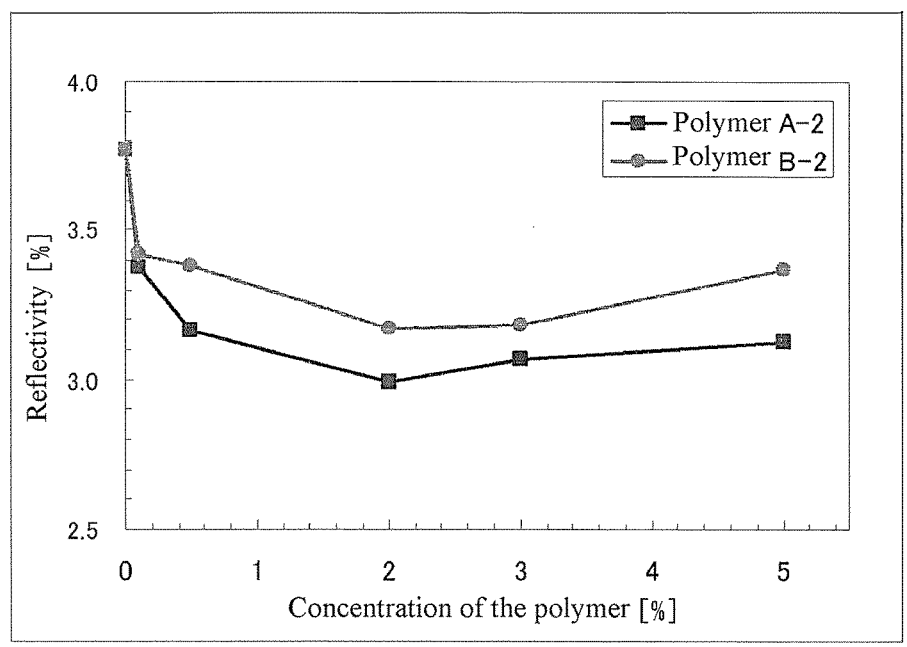
FIG. 7 is a graph, showing the relationship between the reflectivities of coating films (D to I and L to P) and the concentrations of the polymers (A-2 and B-2) contained therein.

The relationship between the reflectivities of the coating films (D to I) and the concentrations of the polymer A-2 contained in the coating films (D to I) is shown in FIG. 7. The relationship between the reflectivities of the coating films (L to P) and the concentrations of the polymer B-2, which has the same fluorine concentration as the polymer A-2, is also plotted for comparison. It is obvious that the reflectivities of the coating films (D to I) are lower than those of the corresponding Comparative Examples irrespective of the concentration of the polymer A-2.

Figure 8:
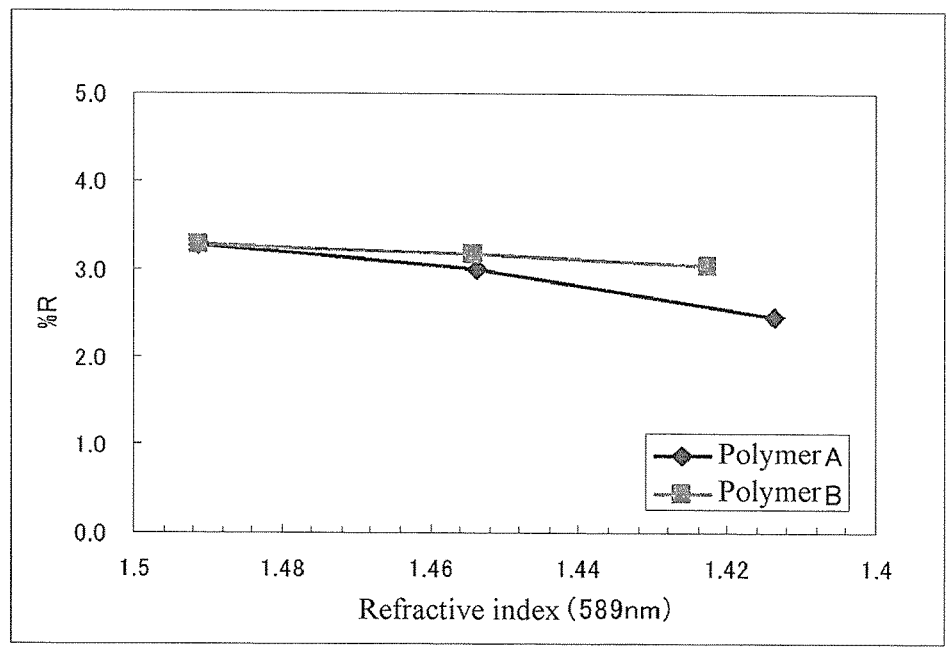
FIG. 8 is a graph, showing the relationship between the refractive indexes of the polymers contained (A-4, A-2, A-3/A-4, B-2, B-3) and the reflectivities of the coating films (K, G, J/K, N, Q).

The relationship between the refractive indexes of the polymers contained (A-4, A-2, A-3/A-4, B-2, B-3) and the reflectivities of the coating films (K, G, J/K, N, Q) is shown in FIG. 8. It is obvious that the polymers of the present invention all exhibit a low reflectivity in spite of being polymers having the same refractive indexes as the polymers of Comparative Examples (refer to Table 3). It should be noted that A-4 (indicated by an overlap of the points) is a polymer of MMA (100% by weight) which is free of the compound (A) and compound (B).

Example 9

The coating agent (G) was applied to a glass substrate (50×50×0.7 (mm)) by spin coating (rotational speed: 2000 rpm×15 seconds=>4000 rpm×60 seconds), and dried at 80° C. for 3 minutes. After that, the film was photocured using a conveyor-type ultraviolet irradiator equipped with a high-pressure mercury lamp (cumulative exposure: 400 mJ/cm$^2$), thereby obtaining a transparent coating film (G). The film thickness, as measured with a contact level-difference meter (α-STEP IQ, manufactured by KLA-Tencor Corporation), was approximately 3 μm. The distribution of refractive index from the most superficial surface to the inside of the film in the coating film (G) was analyzed with a spectroscopic ellipsometer (manufactured by J. A. Woollam Co., Inc.).

Figure 9:
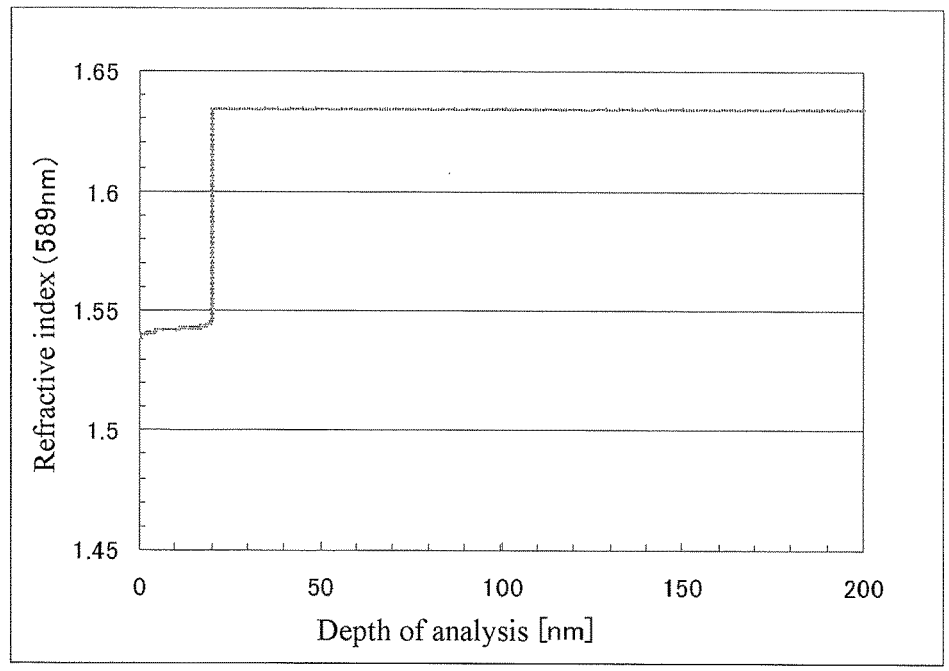
FIG. 9 is a graph showing the distribution state of the refractive index from the most superficial surface of a coating film (G) toward the inside of the film.

The result is shown in FIG. 9. It is obvious that a layer having a refractive index gradient in which the refractive index changes from 1.539 to 1.546 is present in a region from the most superficial surface to the depth of 20 nm and a layer having a refractive index of 1.634 is present in a deeper region (from the depth of 20 nm to the interface with the substrate).

Example 10

Figure 10:
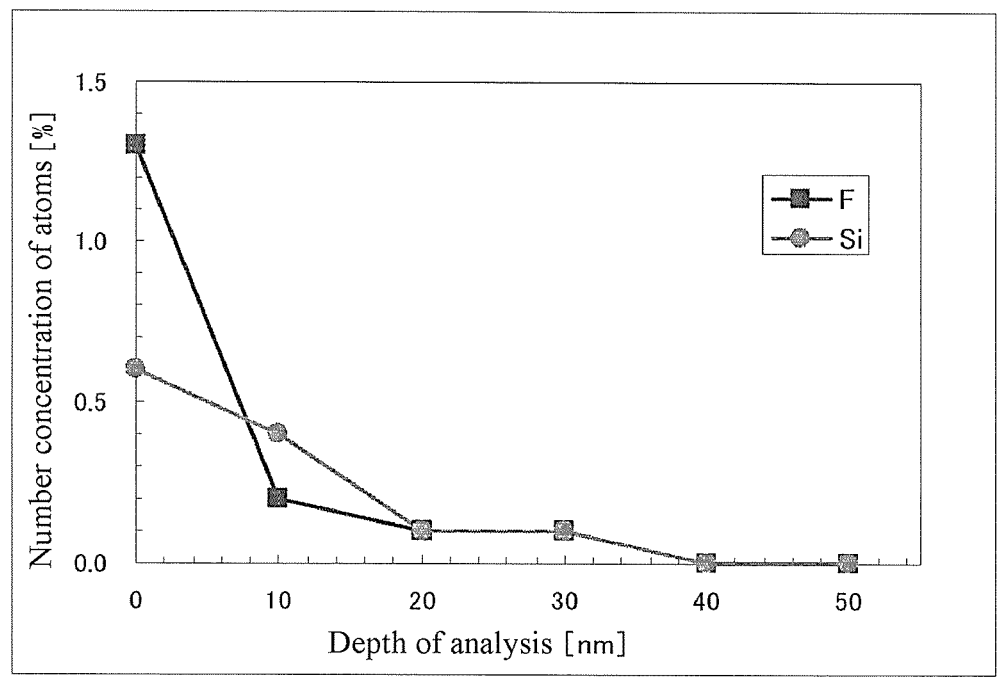
FIG. 10 is a graph showing the change in the concentrations of silicon (Si) and fluorine (F) in the depth direction from the obverse surface of the coating film (G).

Surface analysis was performed on the coating film (G) with an X-ray photoelectron spectroscope (manufactured by Quantera SXM ULVAC-PHI, Inc). Ar ion etching was performed from the surface, and the concentrations of silicon (Si) and fluorine (F) in the depth direction were detected. The result is shown in FIG. 10. The result shown in FIG. 10 indicates that Si and F are present at a high concentration in the surface. Because F and Si are components derived from the low refractive index material, it is obvious that the low refractive index material is mostly present in the surface.

Use of the terms "a," "an," "the" and similar referents used in the context in explanation of the invention (particularly in the context of claims as described below) is to be construed to cover both the singular form and the plural form, unless otherwise indicated herein or clearly contradicted by context. The terms "comprising," "having," "including" and "containing" are to be construed as open-ended terms (more specifically, meaning "including, but not limited to") unless otherwise noted. Recitation of ranges of values herein are merely intended to serve as a shorthand method of referring individually to each separate value falling within the range, unless otherwise indicated herein, and each separate value is incorporated herein as if it were individually recited herein. All methods described herein can be performed in any suitable order unless otherwise indicated herein or otherwise clearly contradicted by context. The use of any and all examples, or exemplary language ("such as") provided herein, is intended merely to better illuminate the invention and does not pose a limitation on the scope of the invention unless otherwise claimed. No language herein should be construed as indicating any non-claimed element as essential to the practice of the invention.

Preferred embodiments of the invention are described herein, including the best mode known to the present inventors for carrying out the invention. Variations of the preferred embodiments may become apparent to those skilled in the art upon reading the foregoing description. The present inventors expect skilled artisans to employ such variations as appropriate, and the present inventors intend for the invention to be practiced otherwise than as specifically described herein. Accordingly, the invention includes all modifications and equivalents of the subject matter recited in the claims appended hereto as permitted by applicable law. Moreover, any combination of the elements in all possible variations thereof is encompassed by the invention unless otherwise indicated herein or otherwise clearly contradicted by context.

What is claimed is:

1. A laminate body comprising:
    a transparent substrate; and
    a refractive layer for refracting incident light provided on an upper side of the substrate;
    wherein the refractive layer is a single layer, the single layer is consisting of a fluorine compound and a resin, the fluorine compound is at least one compound selected from a group consisting of fluorosilsesquioxane and fluorosilsesquioxane polymers, and the refractive layer comprises 0.1 to 4% by weight of fluorine (F) based on the resin,
    wherein a concentration of the fluorine compound dispersed in the resin of the refractive layer is higher on a side opposite the substrate than on a side facing the substrate,
    wherein the refractive layer being a graded-structure layer having a low refractive index and a high refractive index therein,
    wherein the fluorine compound has a refractive index of 1.20 to 1.50,
    wherein the resin has a refractive index of 1.50 to 2.20, and
    wherein the laminate body has an antireflection function.

2. The laminate body according to claim 1,
    wherein the refractive layer is formed by applying a coating liquid containing the fluorine compound and the resin to the upper side of the substrate to form a coated film and curing the coated film in a hydrophobic atmosphere, and
    wherein the fluorine compound has higher hydrophobicity than the resin.

3. The laminate body according to claim 2,
    wherein the fluorine compound has a cage structure.

4. The laminate body according to claim 2,
    wherein the fluorosilsesquioxane polymer as the fluorine compound is an addition polymer of fluorosilsesquioxane having one addition-polymerizable functional group or an addition copolymer of fluorosilsesquioxane having one addition-polymerizable functional group with an addition-polymerizable monomer.

5. The laminate body according to claim 2, further comprising;
    a hard coat layer between the substrate and the refractive layer; and
    a print layer having a surface free energy in a range of 30 to 50 mN/m beneath the substrate.

6. An image display device comprising:
    a laminate body according to claim 2; and
    an image panel provided beneath the laminate body having the refractive layer on the upper side of the substrate.

7. The laminate body according to claim 1,
    wherein the fluorine compound has a cage structure.

8. The laminate body according to claim 1,
    wherein the fluorosilsesquioxane polymer as the fluorine compound is an addition polymer of fluorosilsesquioxane having one addition-polymerizable functional group or an addition copolymer of fluorosilsesquioxane having one addition-polymerizable functional group with an addition-polymerizable monomer.

9. The laminate body according to claim 1, further comprising;
    a hard coat layer between the substrate and the refractive layer; and
    a print layer having a surface free energy in a range of 30 to 50 mN/m beneath the substrate.

10. An image display device comprising:
    a laminate body according to claim 1; and
    an image panel provided beneath the laminate body having the refractive layer on the upper side of the substrate.

11. The laminate body according to claim 1, wherein a layer formed by the transparent substrate and the refractive layer has a total light transmittance greater than or equal to 89.38%.

12. A method for manufacturing a laminate body, the method comprising the steps of:
    preparing a coating liquid containing at least one fluorine compound selected from a group consisting of fluorosilsesquioxane and fluorosilsesquioxane polymers, and a resin;
    applying the coating liquid to an upper side of a transparent substrate in a hydrophobic atmosphere to form a coated film; and
    curing the coated film in a hydrophobic atmosphere to form a single-layered refractive layer, wherein the single-layered refractive layer comprises 0.1 to 4% by weight of fluorine (F) based on the resin, and the single layer is consisting of the fluorine compound and the resin and being a graded-structure layer having a low refractive index and a high refractive index therein,
    wherein the fluorine compound has a refractive index of 1.20 to 1.50,
    wherein the resin has a refractive index of 1.50 to 2.20,
    wherein the fluorine compound has higher hydrophobicity than the resin, and
    wherein the laminate body has an antireflection function.

* * * * *